United States Patent
Jung et al.

(10) Patent No.: US 9,900,894 B2
(45) Date of Patent: Feb. 20, 2018

(54) ELECTRONIC DEVICE AND METHOD FOR MANAGING SPECIFIC ABSORPTION RATE USING MULTIPLE ANTENNAS

(71) Applicant: Samsung Electronics Co., Ltd., Gyeonggi-do (KR)

(72) Inventors: Hyun-Tae Jung, Gyeongsangbuk-do (KR); Jae-Ahn Ryu, Gyeongsangbuk-do (KR); Hyun-Suk Choi, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/416,539

(22) Filed: Jan. 26, 2017

(65) Prior Publication Data
US 2017/0273090 A1 Sep. 21, 2017

(30) Foreign Application Priority Data
Mar. 15, 2016 (KR) .................. 10-2016-0031100

(51) Int. Cl.
| H04B 7/00 | (2006.01) |
| H04W 72/04 | (2009.01) |
| H04B 7/0404 | (2017.01) |
| H04M 1/02 | (2006.01) |
| H04W 84/12 | (2009.01) |

(52) U.S. Cl.
CPC ...... *H04W 72/0493* (2013.01); *H04B 7/0404* (2013.01); *H04M 1/026* (2013.01); *H04W 84/12* (2013.01)

(58) Field of Classification Search
CPC ..... H04B 7/0404; H04M 1/026; H04W 84/12
USPC ................ 455/552.1, 553.1, 575.7
See application file for complete search history.

(56) References Cited

U.S. PATENT DOCUMENTS

| 2006/0160563 | A1* | 7/2006 | Ku ................ H04B 1/406 |
| | | | 455/552.1 |
| 2012/0002995 | A1 | 1/2012 | Choi et al. |
| 2012/0077538 | A1 | 3/2012 | Yun |
| 2012/0206556 | A1 | 8/2012 | Yu et al. |
| 2013/0148636 | A1* | 6/2013 | Lum .............. H04B 1/0064 |
| | | | 370/336 |
| 2013/0172045 | A1 | 7/2013 | Caballero et al. |
| 2014/0105204 | A1* | 4/2014 | Bengtsson ...... H04B 7/0608 |
| | | | 370/345 |
| 2015/0116159 | A1* | 4/2015 | Chen ............... H01Q 5/22 |
| | | | 343/702 |

* cited by examiner

*Primary Examiner* — Ping Hsieh
(74) *Attorney, Agent, or Firm* — The Farrell Law Firm, P.C.

(57) ABSTRACT

Disclosed are an electronic device and a method for managing a specific absorption rate (SAR). In the present disclosure, even if an antenna for second communication is activated while the electronic device transmits/receives wireless signals of a plurality of frequency bands for first communication, an increase in an SAR value by frequency overlapping can be reduced or suppressed.

22 Claims, 26 Drawing Sheets

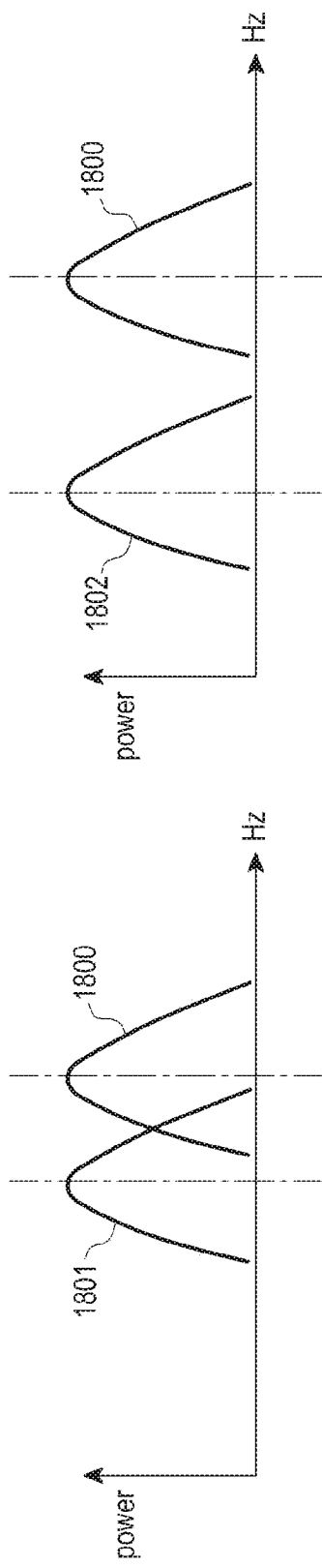
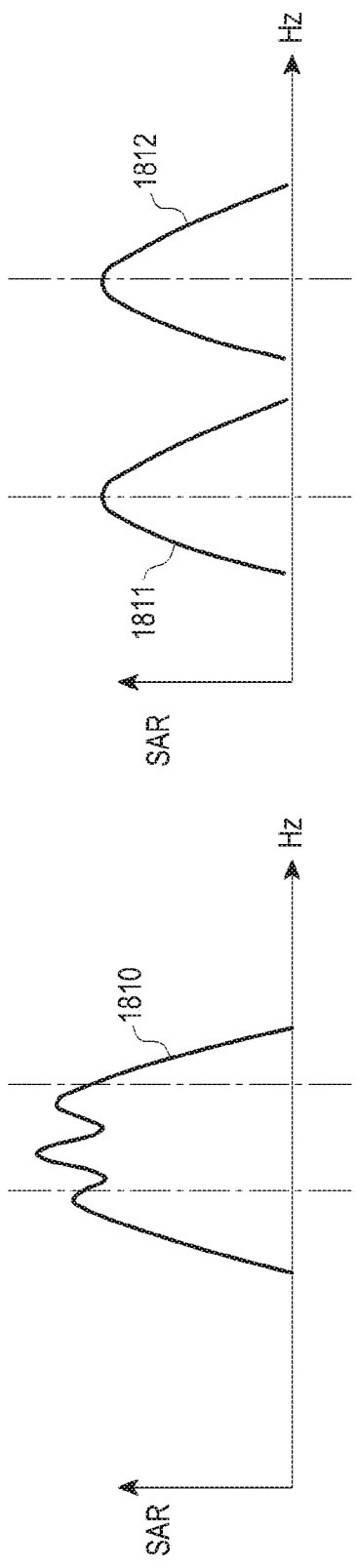
FIG.18A
FIG.18B
FIG.18C
FIG.18D

ELECTRONIC DEVICE AND METHOD FOR MANAGING SPECIFIC ABSORPTION RATE USING MULTIPLE ANTENNAS

PRIORITY

This application claims priority under 35 U.S.C. § 119(a) to a Korean Patent Application which was filed in the Korean Intellectual Property Office on Mar. 15, 2016 and assigned Serial No. 10-2016-0031100, the contents of which are incorporated herein by reference.

BACKGROUND

1. Field of the Disclosure

The present disclosure relates generally to managing a specific absorption rate (SAR) using multiple antennas.

2. Description of the Related Art

Generally, electronic devices such as a mobile communication device, provide both voice communication and high speed data communication services. As such, mobile communication devices perform communication between wearable devices (e.g., a watch and eyeglasses) and communication between Internet of Things (IoT) devices (e.g., a TV and an electric light). In addition to communications between mobile communication devices, the communication service environment has been gradually expanded, so that electronic devices are being regulated in connection with a SAR value.

As technology of using multiple antennas has recently developed, various types of antennas are now provided in electronic devices. When a plurality of antennas are simultaneously used, a problem occurs in that a SAR value may not satisfy a standard.

As such, there is a need in the art for a method and apparatus for providing a SAR value that satisfies a standard, in consideration of the multiple antennas now used in electronic devices.

SUMMARY

The present disclosure has been made to solve the above described problems or other problems in the prior art and to provide the advantages described below.

Accordingly, an aspect of the present disclosure is to provide a method of adjusting an SAR value by controlling multiple antennas that are included in an electronic device.

According to aspects of the present disclosure, an electronic device includes a housing that includes a first face that faces in a first direction, a second face that faces in a second direction that is opposite to, or different from, the first direction, and a third face that encloses at least a portion of a space between the first face and the second face, a first antenna element that is adjacent to, or is positioned in, a first portion of the housing, a second antenna element that is adjacent to, or is positioned in, a second portion of the housing, a third antenna element that is adjacent to, or is positioned in, a third portion of the housing, a first distance between the first portion and the third portion being shorter than a distance between the second portion and the third portion, a first wireless communication circuit that is configured to transmit, through one of the first antenna element and the second antenna element, a first wireless signal of a first frequency band, and transmit, through another one of the first antenna element and the second antenna element, a second wireless signal of a second frequency band which is lower than the first frequency band, the first wireless signal and the second wireless signal being used together and providing carrier aggregation (CA), a second wireless communication circuit that is configured to transmit, through the third antenna element, a third wireless signal of a third frequency band, which at least partially overlap with the first frequency band, a processor that is electrically connected to the first wireless communication circuit and the second wireless communication circuit, and a storage device that is electrically connected to the processor, wherein the storage device stores instructions that, when being executed, cause the processor to control the first wireless communication circuit such that when the first wireless communication circuit and the second wireless communication circuit are at least partially simultaneously used, the first wireless signal is provided through the second antenna element, and the second wireless signal is provided through the first antenna element, and when the first wireless communication circuit and the second wireless communication circuit are not simultaneously used, the first wireless signal is provided through any one of the first antenna element and the second antenna element, and the second wireless signal is provided through another one of the first antenna element and the second antenna element.

According to another aspect of the present disclosure, there is provided a method for managing an SAR in an electronic device that includes a housing that includes a first face that faces in a first direction, a second face that faces in a second direction that is opposite to, or different from, the first direction, and a third face that encloses at least a portion of a space between the first face and the second face; a first antenna element that is adjacent to, or is positioned in, a first portion of the housing, a second antenna element that is adjacent to, or is positioned in, a second portion of the housing, a third antenna element that is adjacent to, or is positioned in, a third portion of the housing, a first distance between the first portion and the third portion being shorter than a distance between the second portion and the third portion, a first wireless communication circuit that is configured to transmit, through one of the first antenna element and the second antenna element, a first wireless signal of a first frequency band, and configured to transmit, through another one of the first antenna element and the second antenna element, a second wireless of a second frequency band; and a second wireless communication circuit that is configured to transmit, through the third antenna element, a third wireless signal of a third frequency band, the method including determining whether the first wireless communication circuit and the second wireless communication circuit are used together in order to provide CA, determining, when the first wireless communication circuit and the second wireless communication circuit are used together, whether the third frequency band at least partially overlaps with the frequency band, providing, when the third frequency band at least partially overlaps with the first frequency band, the first wireless signal through the second antenna element, and the second wireless signal through the first antenna element, and providing, when the first wireless communication circuit and the second wireless communication circuit are not simultaneously used, the first wireless signal through any one of the first antenna element and the second antenna element, and the second wireless signal is provided through another one of the first antenna element and the second antenna element.

BRIEF DESCRIPTION OF THE DRAWINGS

The above and other aspects, features, and advantages of the present disclosure will be more apparent from the following detailed description taken in conjunction with the accompanying drawings, in which:

FIGS. 18A, 18B, 18C and 18D are a method for changing frequency channels from overlapping frequency channels to frequency channels that have a far spacing therebetween;

DETAILED DESCRIPTION OF EMBODIMENTS OF THE PRESENT DISCLOSURE

Figure 1:
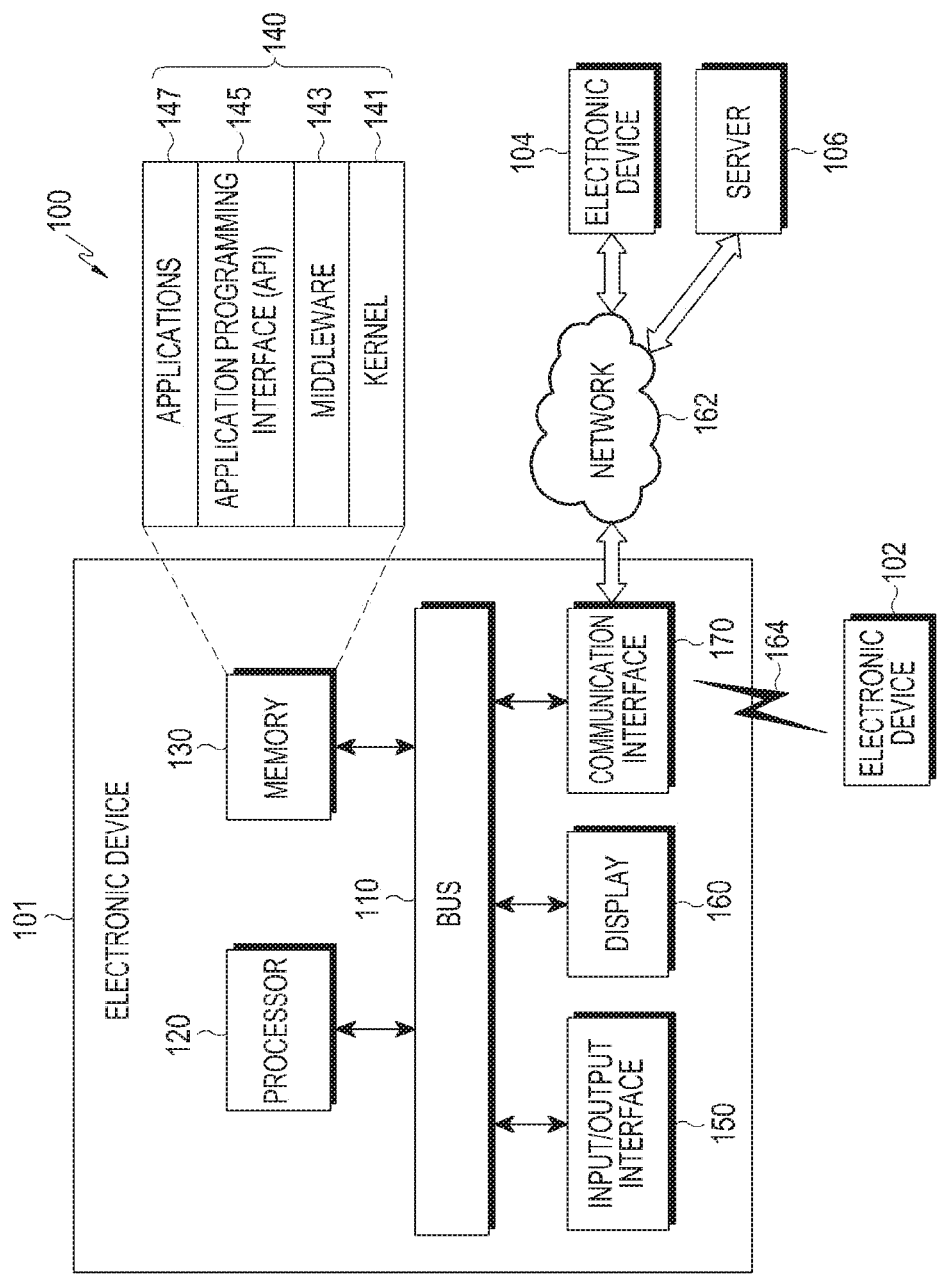
FIG. 1 is a view illustrating a network environment that includes an electronic device, according to embodiments of the present disclosure.

Hereinafter, embodiments of the present disclosure will be described with reference to the accompanying drawings. It shall be understood that an embodiment and terms for describing the embodiment are not intended to limit the techniques disclosed herein to a specific embodiment, and include various modifications, equivalents, and/or substitutions of the corresponding embodiment.

In describing the drawings, similar reference numerals may be used to designate similar constituent elements. As used herein, singular forms may include plural forms as well unless the context clearly indicates otherwise. In the present disclosure, the expressions "A or B", "at least one of A and/or B", or "A/B" may include all possible combinations of the items listed. The expressions "a first", "a second", "the first", or "the second" may modify corresponding elements regardless of the order or importance, and are used only to distinguish one element from another element, but do not limit the corresponding elements. When an element, such as a first element, is referred to as being functionally or communicatively connected, or directly coupled to another element, such as a second element, the first element may be connected directly to the second element or connected to the second element through yet another element, such as a third element.

The expression "configured to" as used in embodiments of the present disclosure may be interchangeably used with "suitable for", "having the capacity to", "designed to", "adapted to", "made to", or "capable of" in terms of hardware or software, according to circumstances. Alternatively, in some situations, the expression "device configured to" may indicate that the device, together with other devices or components, "is able to". For example, the phrase "processor adapted (or configured) to perform A, B, and C" may indicate a dedicated processor only for performing the corresponding operations or a generic-purpose processor, such as a central processing unit (CPU) or application processor (AP) that can perform the corresponding operations by executing one or more software programs stored in a memory device.

An electronic device according to embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion pictures experts group (MPEG)-1 audio layer-3 (MP3) player, a mobile medical device, a camera, and a wearable device such as an accessory type (e.g., a watch, ring, bracelet, anklet, necklace, glasses, contact lens, or a head-mounted device (HMD), a fabric or clothing integrated type such as electronic clothing, a body-mounted type such as a skin pad, or tattoo, and a bio-implantable type such as an implantable circuit. In some embodiments, the electronic device may include at least one of a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung Home-Sync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices such as a blood glucose monitoring device, a heart rate monitoring device, a blood pressure measuring device, and a body temperature measuring device, a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), point of sales (POS) device, or IoT device such as a light bulb, various sensors, electric or gas meter, a sprinkler device, a fire alarm, a thermostat, a streetlamp, a toaster, sporting goods, a hot water tank, heater, and a boiler.

According to some embodiments, an electronic device may include at least one of a part of furniture or a building/structure, an electronic board, an electronic signature receiving device, a projector, and various types of measuring instruments, such as a water meter, an electric meter, a gas meter, or a radio wave meter. The electronic device may be flexible, or may be a combination of one or more of the aforementioned various devices. The electronic device is not limited to the above described devices. In the present disclosure, the term "user" may indicate a person using an electronic device or an artificial intelligence electronic device using an electronic device.

Descriptions will be made on an electronic device 101 within a network environment 100 in embodiments with reference to FIG. 1. The electronic device 101 may include a bus 100, a processor 120, a memory 130, an input/output interface 150, a display 160, and a communication interface 170. In a certain embodiment, the electronic device 101 may omit at least one of the above-mentioned components or may additionally include other components.

The bus 110 may include a circuit that interconnects the above-mentioned components 110 to 170 and transmits communication (e.g., a control message or data) between the components.

The processor 120 may include one or more of a central processing unit (CPU), an application processor (AP), and a communication processor (CP). The processor 120 may execute an arithmetic operation or data processing that is related to a control and/or communication of one or more other components of the electronic device 101.

The memory 130 may include a volatile memory and/or a non-volatile memory. The memory 130 may store commands or data that are related to one or more other components of the electronic device 101.

According to one embodiment, the memory 130 may store software and/or a program 140. The program 140 may include a kernel 141, middleware 143, an application programming interface (API) 145, and/or applications 147. At least one of the kernel 141, the middleware 143, and the API 145 may be referred to as an operating system (OS).

The kernel 141 may control or manage system resources such as the bus 1100, the processor 120, or the memory 130 that are used for executing operations or functions implemented in the other programs, such as the middleware 143, the API 145, or the applications 147. In addition, the kernel 141 may provide an interface that allows the middleware 143, the API 145, or the applications 147 to access individual components of the electronic device 101 so as to control or manage the system resources.

The middleware 143 may play an intermediary role such that the API 145 or the applications 147 may communicate with the kernel 141 so as to exchange data. In addition, the middleware 143 may process, according to priority, one or more task requests that are received from the applications 147. For example, the middleware 143 may assign the priority to be capable of using a system resource of the electronic device 101 to at least one of the applications 147, and may process the one or more task requests. The API 145 allows the applications 147 to control functions provided from the kernel 141 or the middleware 143, and may include one or more interfaces or functions for a file control, a window control, an image processing, or a character control. The input/output interface 150 transmits commands or data, which are entered from a user or any other external device, to the other component(s) of the electronic device 101, or may output commands or data, which are received from the other component(s) of the electronic device 101, to the user or the other external device.

The display device 160 may include a liquid crystal display (LCD), a light emitting diode (LED) display, an organic light emitting diode (OLED) display, a microelectromechanical system (MEMS), or an electronic paper display. The display 160 may display various contents (e.g., text, image, video, icon, or symbol) to the user. The display 160 may include a touch screen, and receives a touch input, a gesture input, a proximity input, or a hovering input that is made using an electronic pen or a part of the user's body.

The communication interface 170 may set communication between the electronic device 101 and an external device, such as a first external electronic device 102, a second external device 104, or a server 106. For example, the communication interface 170 may be connected with a network 162 through wired or wireless communication so as to communicate with the second external electronic device 104 or the server 106.

The wireless communication may include a cellular communication that uses at least one of long-term evolution (LTE), LTE advanced (LTE-A), code division multiple access (CDMA), wideband CDMA (WCDMA), universal mobile telecommunication system (UMTS), wireless broadband (WiBro), and global system for mobile communication (GSM). The wireless communication may include at least one of wireless fidelity (WiFi), Bluetooth™, Bluetooth low energy (BLE), ZigBee™, near field communication (NFC), magnetic secure transmission, radio frequency (RF), or body area network (BAN). The wireless communication may include a global positioning system (GPS), global navigation satellite system (GNSS), Beidou navigation satellite system (Beidou), Galileo, and the European global satellite-based navigation system. Herein, "GPS" may be interchangeably used with "GNSS" below. The wired communication may use at least one of universal serial bus (USB), high definition multimedia interface (HDMI), recommended standard 232 (RS-232), and plain old telephone service (POTS). The network 162 may include a telecommunication network such as local area network (LAN) or wide area network (WAN), the Internet, and a telephone network.

Each of the first and second external electronic devices 102 and 104 may be a type of device that is the same as, or different from, the electronic device 101.

According to embodiments, all or some of the operations to be executed by the electronic device 101 may be executed by another electronic device or a plurality of other electronic devices (e.g., the electronic devices 102 and 104 or the server 106).

According to one embodiment, when the electronic device 101 should perform a certain function or service automatically or by a request, the electronic device 101 may request some functions or services that are associated therewith from the other electronic devices, instead of, or in addition to, executing the functions or services by itself. The other electronic devices may execute the requested functions or additional functions, and transmits the results to the electronic device 101. The electronic device 101 may provide the requested functions or services by processing the received results as they are or additionally. For this purpose a cloud computing technique, a distributed computing technique, or a client-server computing technique may be used.

Figure 2:
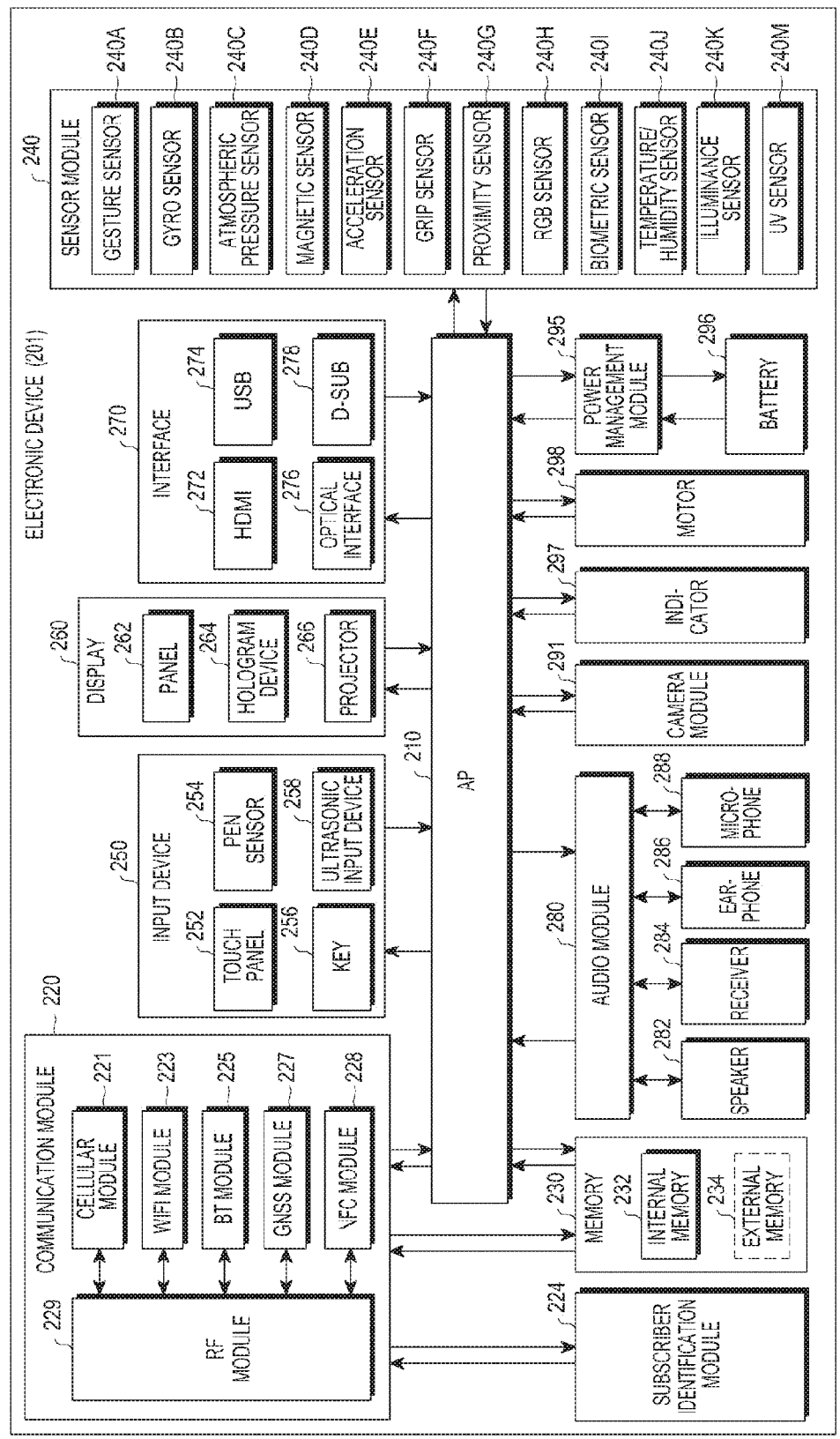
FIG. 2 is a block diagram of an electronic device according to embodiments of the present disclosure.

FIG. 2 is a block diagram of an electronic device 201 according to embodiments of the present disclosure. The electronic device 201 may include the whole or a portion of the electronic device 101 illustrated in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298. The AP 210 may drive an operating system or an application program so as to control a plurality of hardware or software components connected thereto, and may also perform various data processing and arithmetic operations. The AP 210 may be implemented by a system-on-chip (SoC).

According to one embodiment, the AP 210 may further include a graphic processing unit (GPU) and/or an image signal processor. The AP 210 may include at least some components (e.g., the cellular module 221) among the components illustrated in FIG. 2. The AP 210 may load a command or data received from at least one of a non-volatile memory in a volatile memory to process the command and data, and may store result data in a non-volatile memory.

The communication module 220 may have a configuration identical or similar to that of the communication interface 170 illustrated in FIG. 1. The communication module 220 may include a cellular module 221, a WiFi module 223, a Bluetooth module 225, a GNSS module 227, an NFC module 228, and a radio frequency (RF) module 229. The cellular module 221 may provide a voice call, a video call, a message service, or an internet service through a communication network. According to one embodiment, the cellular module 221 may perform discrimination and authentication of the electronic device 201 within the communication network by using the SIM card 224.

According to one embodiment, the cellular module 221 may perform at least some of the functions that may be provided by the AP 210. The cellular module 221 may include a communication processor (CP). At least two of the cellular module 221, the WiFi module 223, the Bluetooth module 225, the GNSS module 227, and the NFC module 228 may be incorporated in a single integrated chip (IC) or an IC package. The RF module 229 transmits/receive a communication signal (e.g., an RF signal). The RF module 229 may include a transceiver, a Power Amp Module (PAM), a frequency filter, a Low Noise Amplifier (LNA), or an antenna. According to another embodiment, at least one of the cellular module 221, the WiFi module 223, the Bluetooth module 225, the GNSS module 227, and the NFC module 228 transmits/receive an RF signal through one or more separate RF modules. The SIM card 224 may include a SIM and/or an embedded SIM, and may also include intrinsic identification information (e.g., integrated circuit card identifier (ICCID)) or subscriber information (e.g., international mobile subscriber identity (IMSI)).

The memory 230 may include an internal memory 232 or an external memory 234. The internal memory 232 may include at least one of a volatile memory (e.g., a dynamic random access memory (DRAM), a synchronous RAM (SRAM), or a synchronous dynamic RAM (SDRAM), a non-volatile memory (e.g., a one time programmable read only memory (OTPROM), a PROM, an erasable and programmable ROM (EPROM), an electrically erasable and programmable ROM (EEPROM), a mask ROM, a flash ROM, a flash memory, a hard drive, and a solid state drive (SSD). The external memory 234 may further include a flash drive (e.g., a compact flash (CF), secure digital (SD) card, a micro secure digital (Micro-SD) card, a Mini Secure Digital (Mini-SD), an extreme digital (xD) card, a multi-media card (MMC), or a memory stick. The external memory 234 may be functionally or physically connected to the electronic device 201 through various interfaces.

For example, the sensor module 240 may measure a physical quantity or may sense an operating status of the electronic device 201, and may then convert the measured or sensed information into electric signals. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a biometric sensor 240I, a temperature/humidity sensor 240J, an illuminance sensor 240K, and a Ultra-Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors incorporated therein. The electronic device 201 may further include a processor configured to control the sensor module 240 as a part of the AP 210 or separate from the AP 210 so as to control the sensor module 240 while the AP 210 is in the sleep state.

The input device 250 may include a touch panel 252, a (digital) pen sensor 254, a key 256, and an ultrasonic input device 258. As the touch panel 252, at least one of a capacitive type touch panel, a resistive type touch panel, an infrared type touch panel, and an ultrasonic type touch panel may be used, and the touch panel 252 may further include a control circuit. The touch panel 252 may further include a tactile layer so as to provide a tactile reaction to the user. The (digital) pen sensor 254 may be a portion of the touch panel, or may include a separate recognition sheet. The key 256 may include a physical button, an optical key, or a keypad. The ultrasonic input device 258 may sense, through a microphone 288, ultrasonic waves generated by an input tool so as to confirm data corresponding to the sensed ultrasonic waves.

The display 260 may include a panel 262, a hologram device 264, a projector 266, and/or a control circuit for controlling these components. The panel 262 may be implemented to be flexible, transparent, or wearable. The panel 262 may be constituted with the touch panel 252 and one or more modules. According to one embodiment, the panel 262 may include a pressure sensor (or a force sensor) that is capable of measuring the intensity of a pressure for a user's touch. The pressure sensor may be integrally implemented with the touch panel 252, or implemented by one or more sensors separately from the touch panel 252. The hologram device 264 may show a stereoscopic image in the air using interference of light. The projector 266 may project light onto a screen so as to display an image. The screen may be located inside or outside the electronic device 201. The interface 270 may include a high density multimedia interface (HDMI) 272, a universal serial bus (USB) 274, an optical interface 276, or a d-subminiature (D-sub) 278. For example, the interface 270 may be included in the communication interface 170 illustrated in FIG. 1. Additionally or alternatively, the interface 270 may include a mobile high-definition link (MHL) interface, an SD card/multi-media card (MMC) interface, or an infrared data association (IrDA) standard interface.

The audio module 280 may bi-directionally convert sound and electric signals. At least some of the components of the audio module 280 may be included in the input/output interface 150 illustrated in FIG. 1. The audio module 280 may process sound information input or output through a speaker 282, a receiver 284, an earphone 286, or the microphone 288. The camera module 291 is a device that is capable of photographing a still image and a video image, and according to one embodiment, the camera module 291 may include at least one image sensor (e.g., a front sensor or a rear sensor), a lens, an image signal processor (ISP), or a flash (e.g., light emitting diode (LED) or xenon lamp.

The power management module 295 may manage the electric power of the electronic device 201. According to one embodiment, the power management module 295 may include a power management integrated circuit (PMIC), a charger integrated circuit (IC), or a battery gauge. The PMIC may be configured in a wired and/or wireless charge type. The wireless charge type may include a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include a rechargeable battery and/or a solar battery.

According to one embodiment, the power management module 295 may adjust communication power based on confirmed communication power information. The communication power information may include an amount of transmission power, which is used for emitting a transmission signal and an amount of reception power, which is used for receiving a reception signal. For example, the power management module 295 may change the current amount of transmission power to a confirmed amount of transmission power.

The indicator 297 may indicate a specific status of the electronic device 201 or of a part thereof, such as a booting, a message, or a charged status. The motor 298 may convert an electric signal into a mechanical vibration, and may generate a vibration or a haptic effect. The electronic device 201 may include a mobile TV support device (e.g., a GPU) that is capable of processing media data according to a standard of digital multimedia broadcasting (DMB), digital video broadcasting (DVB), or Mediaflo™. Each of the above-described component elements of hardware according to the present disclosure may be configured with one or more components, and the names of the corresponding component elements may vary based on the type of electronic device. According to embodiments, the electronic device 201 does not include some elements or further include additional elements. Some of elements are coupled to constitute one object but the electronic device may perform the same functions as those which the corresponding elements have before being coupled to each other.

Figure 3:
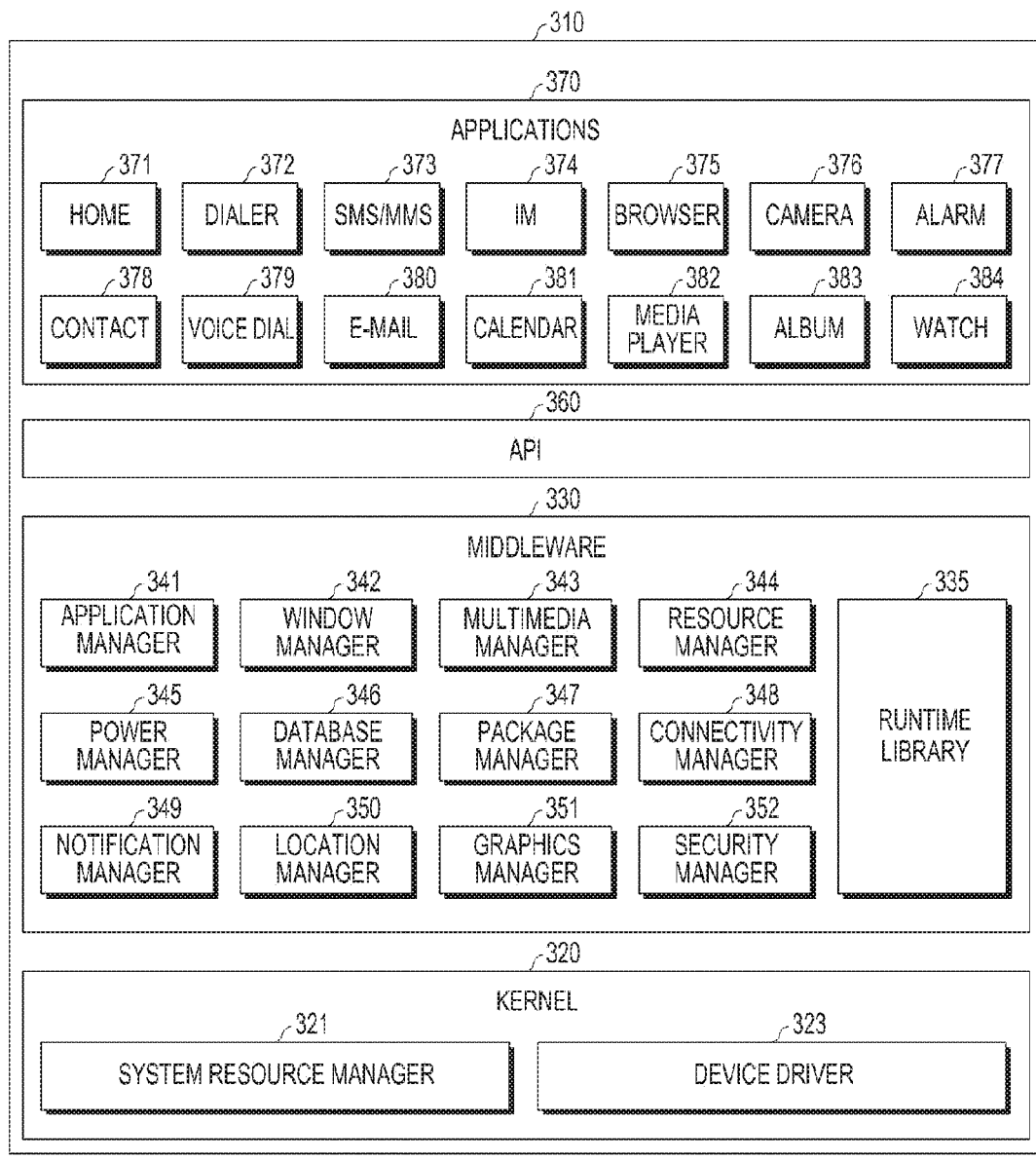
FIG. 3 is a block diagram illustrating a program module according to embodiments of the present disclosure.

FIG. 3 is a block diagram illustrating a program module according to embodiments of the present disclosure. According to one embodiment, a program module 310 may include an Operating System (OS) that controls resources associated with an electronic device and/or various applications that are driven on the operating system. The operating system may include Android™, iOS™, Windows™, Symbian™, Tizen™, or Bada™. Referring to FIG. 3, the program module 310 may include a kernel 320, a middleware 330, an API, and/or applications 370. At least a part of the program module 310 may be preloaded on the electronic device, or may be downloaded from an external electronic device.

The kernel 320 may include a system resource manager 321 and/or a device driver 323. The system resource manager 321 may perform a control, allocation, or recovery of a system resource. According to one embodiment, the system resource manager 321 may include a process management unit, a memory management unit, or a file system management unit. The device driver 323 may include a display driver, a camera driver, a Bluetooth driver, a sharing memory driver, a universal serial bus (USB) driver, a keypad driver, a WiFi driver, an audio driver, or an inter-process communication (IPC) driver. The middleware 330 may provide a function that is commonly required by the applications 370, or may provide various functions to the applications 370 through the API 360 such that the applications 370 can efficiently use the limited system resources within the electronic device.

According to one embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manger 350, a graphics manager 351, and a security manager 352.

The runtime library 335 may include a library module that is used by a compiler in order to add a new function through a program language while the applications 370 are executed. The runtime library 335 may perform input/output management, memory management, or processing of an arithmetic function. The application manager 341 may manage a life cycle of the applications 370. The window manager 342 may manage a GUI resource that is used in a screen. The multimedia manager 343 may obtain a format required for reproducing various media files, and may perform encoding or decoding of the media files by using a codec that is suitable for the corresponding format. The application manager 344 may manage a source code of the applications 370 or a memory space. The power manager 345 may manager a battery capacity or power, and may provide power information required for operating the electronic device. According to one embodiment, the power manager 345 may be interlocked with a basic input/output system (BIOS). The database manager 346 may generate, retrieve, or change a database to be used by the applications 370. The package manager 347 may manage the installation or update of an application that is distributed in the form of a package file.

The connectivity manager 348 may manage a wireless connection. The notification manager 349 may provide events of an arrival massage, a promise, or a proximity notification, to the user. The location manager 350 may manage the position information of the electronic device. The graphic manager 351 may manage a graphic effect to be provided to the user or a user interface associated therewith. The security manager 352 may provide system security or user authentication. According to one embodiment, the middleware 330 may include a telephony manager that manages a voice or video call function of the electronic device or a middleware module that may combine the functions of the above-described components. The middleware 330 may provide a module that is specialized for each type of operation system. In addition, the middleware 330 may dynamically delete some of the existing components or add new components. The API 360 is a collection of API programming functions, and may be provided in different configurations depending on operation systems. For example, Android or iOS may provide one API set for each platform, and Tizen may provide two or more API sets for each platform.

The applications 370 may include one or more applications for providing a home 371, a dialer 372, a short message service/multimedia messaging service(SMS/MMS) 373, an instant message (IM) 374, a browser 375, a camera 376, an alarm 377, a contact 378, a voice dial 379, an e-mail 380, a calendar 381, a media player 382, an album 383, and a watch 384, health care information (e.g., measurement of a quantity of motion, or blood sugar), or environmental information (e.g., atmospheric pressure, humidity, or temperature information). According to one embodiment, the applications 370 may include an information exchange application that may support information exchange between the electronic device and an external electronic device. The information exchange application may include a notification relay application to transmit specific information to the external electronic devices, or a device management application to manage the external electronic devices. For example, the notification relay application may relay notification information generated by another application of the electronic device, or receives notification from an external electronic device and may provide the notification information to the user. The device management application may install, delete, or update a function of an external electronic device that communicates with the electronic device, such as turn-on/turn-off of all or part of the external electronic device itself or adjustment of brightness (or resolution) of a display, or an application operated in the external electronic device.

According to one embodiment, the applications 370 may include an application designated according to an attribute of an external electronic device (e.g., a healthcare application of a mobile medical device). The applications 370 may include an application received from an external electronic device. At least a part of the program module 310 may be executed by software, firmware, hardware (e.g., the processor 210), or a combination of at least two of them, and may include a module, a program, a routine, a command set, or a process for performing one or more functions.

Figure 4:
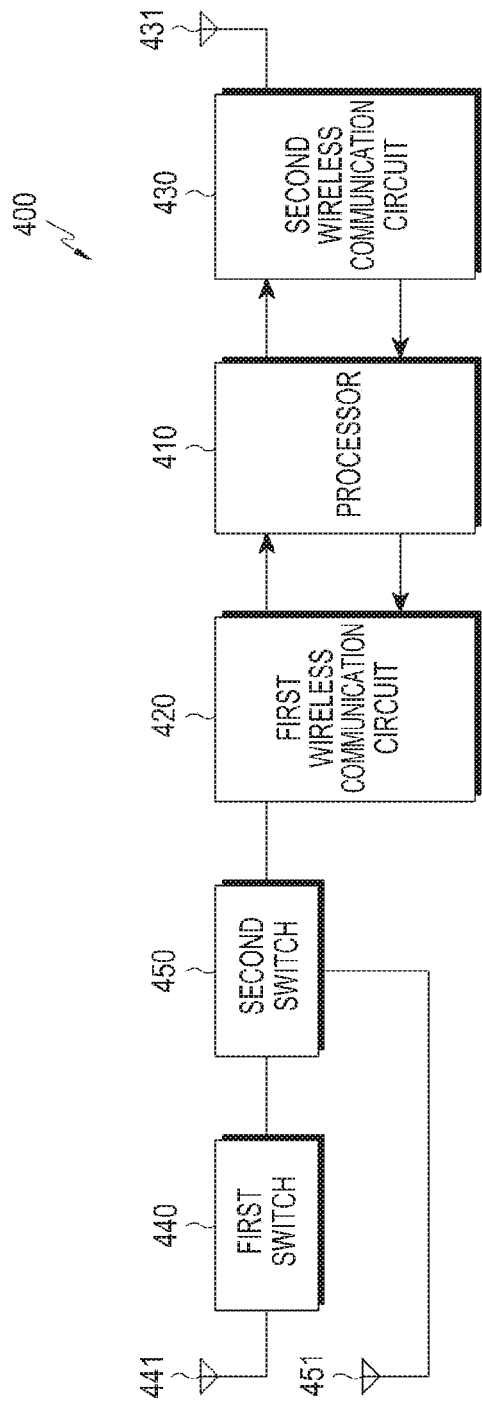
FIG. 4 is a block diagram of an electronic device including three antenna elements according to embodiments of the present disclosure.

FIG. 4 is a block diagram of an electronic device including three antenna elements according to embodiments of the present disclosure.

The electronic device 400 may include a housing that includes a first face that faces in a first direction, a second face that faces in a second direction that is opposite to, or different from, the first direction, and a third face that encloses at least a portion of a space between the first face and the second face.

According to one embodiment, the electronic device 400 may include, within the housing, a first antenna unit 441 that is positioned at or near a first portion of the housing, a second antenna unit 451 that is positioned at or near a second portion of the housing, and a third antenna unit 431 that is positioned at or near a third portion of the housing. For example, a first distance between the first portion and the third portion may be shorter than a second distance between the second portion and the third portion.

According to one embodiment, the housing may include a conductive member that is attached to the inner face of the housing to be utilized as an antenna radiator. The housing may include a non-conductive housing (e.g., glass) or a conductive housing (e.g., metal). The conductive housing (e.g., metal) may use a split structure as a radiator of each antenna.

Referring to FIG. 4, the electronic device 400 may include a first wireless communication circuit 420 that is connected to the first antenna unit 441, and the second antenna unit 451. The first wireless communication circuit 420 transmits a first wireless signal of a first frequency band through any one of the first antenna unit 441 and the second antenna unit 451, and transmits a second wireless signal of a second frequency band through another one of the first antenna unit 441 and the second antenna unit 451. For example, the second frequency band is lower than the first frequency band, and the first wireless signal and the second wireless signal may be used together in order to provide carrier aggregation (CA). The first wireless signal may be transferred to a first switch 440 through a second switch 450, then transferred to the first antenna unit 441 through the first switch 440, and then output through the first antenna unit 441. The second wireless signal may be transferred to the second antenna unit 451 through the second switch 450, and then output through the second antenna unit 451.

According to one embodiment, the electronic device 400 may include a second wireless communication circuit 430 that is connected to the third antenna unit 431. The second wireless communication circuit 430 transmits a third wireless signal of a third frequency band through the third antenna unit 431. The first wireless communication circuit 420 and the second wireless communication circuit 430 may be electrically connected to each other. For example, the third frequency band may at least partially overlap with a first frequency band.

According to one embodiment, the electronic device 400 may include a processor 410 that controls the first wireless communication circuit such that, when the first wireless communication circuit 420 and the second wireless communication circuit 430 are at least partially simultaneously used, the first wireless signal is provided through the second antenna unit 451 and the second wireless signal is provided through the first antenna unit 441. The processor 410 may be electrically connected to the first wireless communication circuit 420 and the second wireless communication circuit 430. The first wireless signal may be transferred to the second antenna unit 451 through the second switch 450, and then output through the second antenna unit 451. The second wireless signal may be transferred to the first switch 440 through the second switch 450, then transferred to the first antenna unit 441 through the first switch 440, and then output through the first antenna unit 441.

According to one embodiment, the processor 410 may control the first wireless communication circuit such that, when the first wireless communication circuit 420 and the second wireless communication circuit 430 are not simultaneously used, the first wireless signal is provided through any one of the first antenna unit 441 and the second antenna unit 451, and the second wireless signal is provided through another one of the first antenna unit 441 and the second antenna unit 451.

Figure 5A:
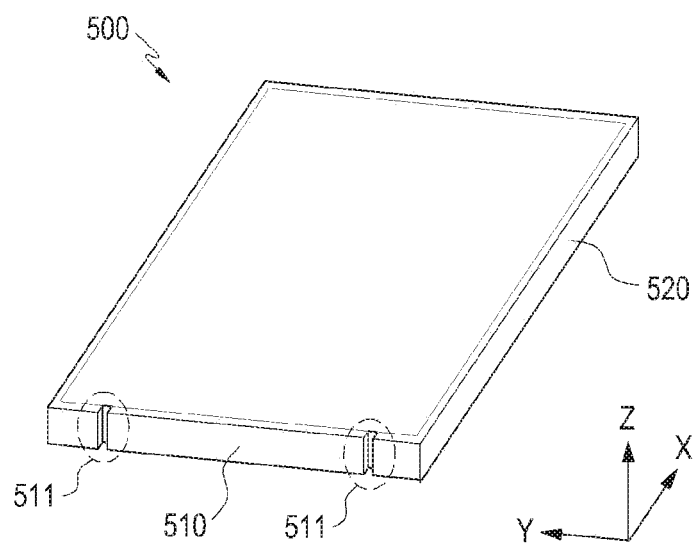
FIGS. 5A and 5B illustrate a housing according to embodiments of the present disclosure.
Figure 5B:
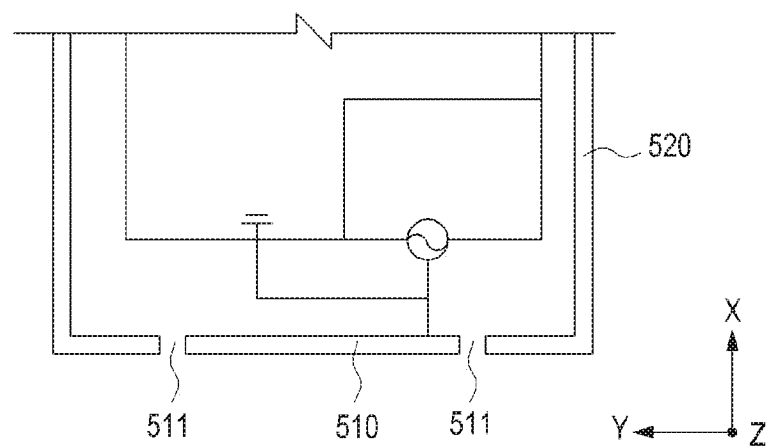

FIGS. 5A and 5B illustrate a housing according to embodiments of the present disclosure.

Referring to FIGS. 5A and 5B, the first side face 510 of the conductive housing of the electronic device 500 may be split from the second side face 520 by split portions 511 that may be replaced by a non-conductive material. The electronic device 500 may be the same as, or similar to, the electronic device 400 illustrated in FIG. 4.

Figure 6A:
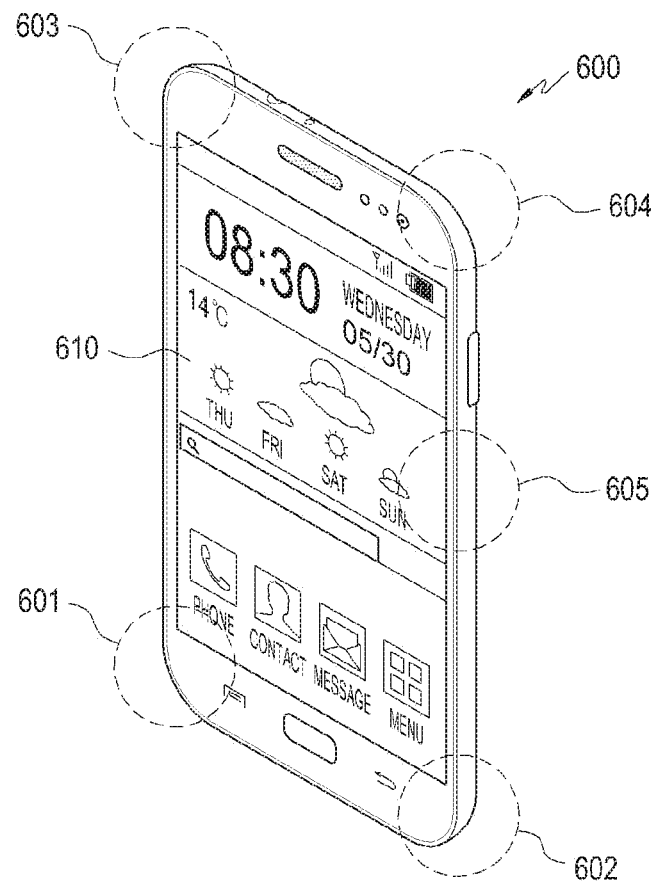
FIGS. 6A, 6B and 6C illustrate the positions of a plurality of antenna elements included in an electronic device according to embodiments of the present disclosure.
Figure 6B:
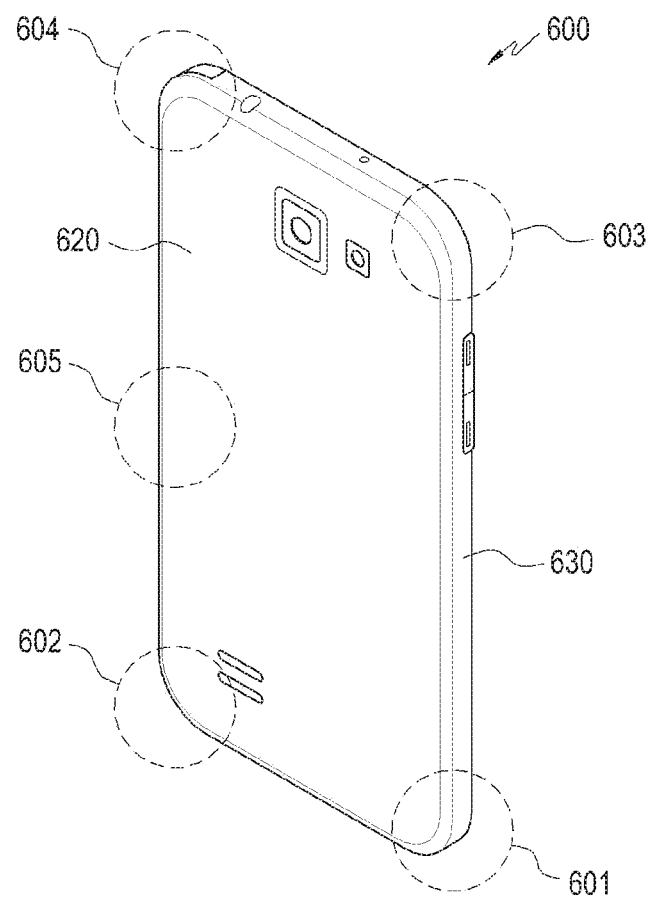
Figure 6C:
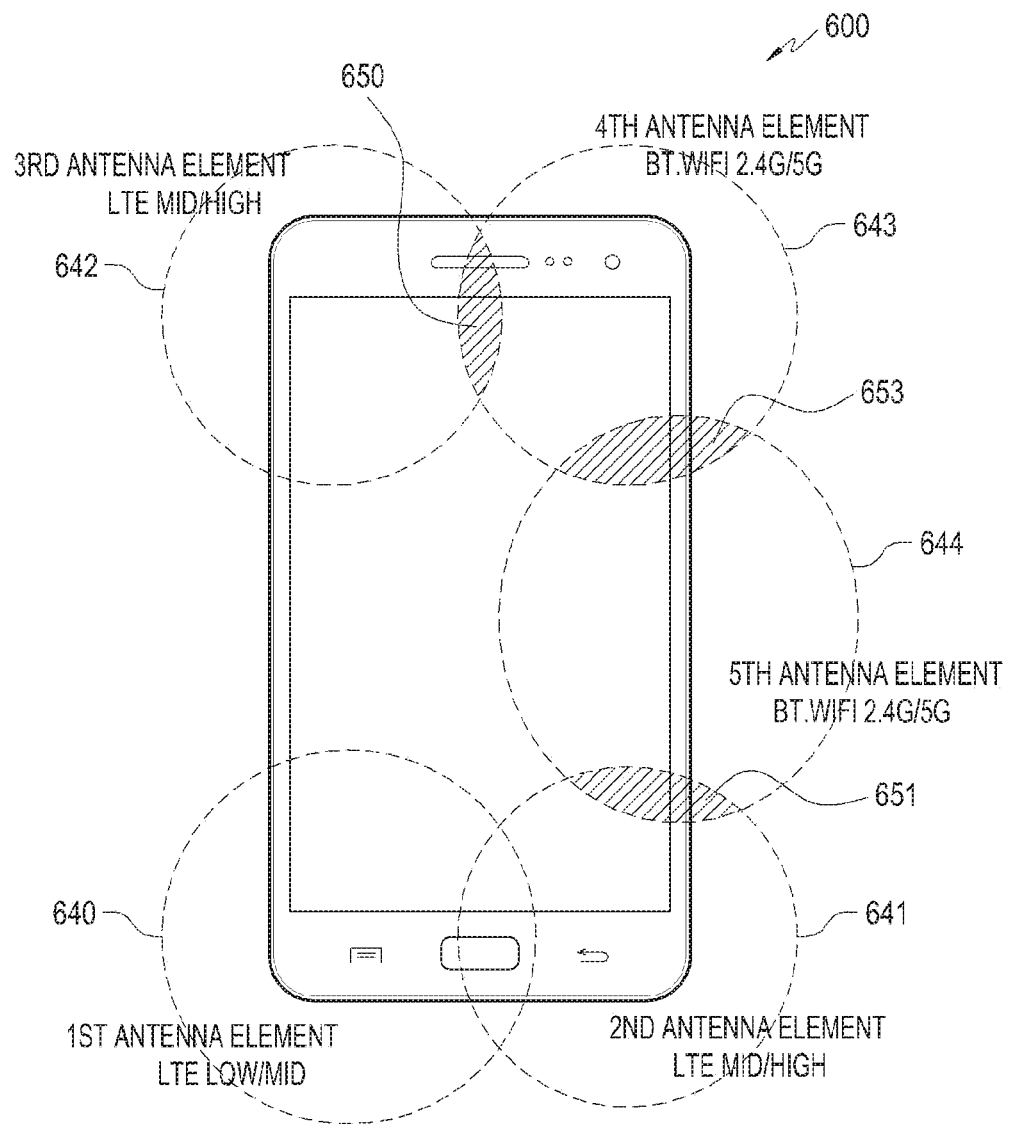

FIGS. 6A, 6B and 6C illustrate the positions of a plurality of antenna elements included in an electronic device according to embodiments of the present disclosure.

Referring to FIGS. 6A and 6B, the electronic device 600 includes a housing, and the housing may include a front face (or a first face) 610 on which the display is positioned, a rear face (or a second face) 620 positioned in the opposite direction (or opposite side) to the front face 610, and a side face (or a third face) 630 that encloses at least a portion of a space between the front face 610 and the rear face 620. According to embodiments, the electronic device 600 may be the same as, or similar to, the electronic device 400 illustrated in FIG. 4 or the electronic device 500 illustrated in FIG. 5.

An antenna module including a plurality of antenna elements is positioned within the housing.

According to one embodiment, the plurality of antenna elements may be vertically disposed in the housing in at least two of a first portion 601 of the housing (e.g., the left side of the lower end), a second portion 602 of the housing (e.g., the right side of the lower end), a third portion 603 of the housing (e.g., the left side of the upper end), a fourth portion 604 (e.g., the right side of the upper end), and a fifth portion 605 (e.g., the central right side).

For example, when the electronic device 400 includes five (5) antenna elements, the first antenna element may be disposed in the first portion 601 of the housing, the second antenna element may be disposed in the second portion 602 of the housing, the third antenna element may be disposed in the third portion 603 of the housing, the fourth antenna element may be disposed in the fourth portion 604 of the housing, and the fifth antenna element may be disposed in the fifth portion 605 of the housing.

According to one embodiment, the first antenna element and the second antenna element disposed in the lower end 601 or 602 of the housing may operate as main antennas that transmit/receive voice or data for first communication, which hereinafter will be understood as third generation (3G) or long term evolution (LTE), and the third antenna element disposed in the upper end 603 of the housing may operate as a sub-antenna that transmits/receives voice or data for the first communication. The fourth antenna element disposed in the upper end 604 of the housing and the fifth antenna element disposed in the central right side 605 may be for second communication, which hereinafter will be understood as WiFi or Bluetooth.

As illustrated in FIG. 6C, according to embodiments of the present disclosure, the first antenna element transmits a first wireless signal of a second frequency band, which hereinafter will be understood as a middle frequency band (1.7 GHz to 2.1 GHz) and a third frequency band, which hereinafter will be understood as a low frequency band (1 GHz or less) for the first communication. The first antenna element may have a first radiating near-field region 640.

The second antenna element transmits a second wireless signal of the second frequency band and a first frequency band, which hereinafter will be understood as a high frequency band (2.3 GHz to 2.7 GHz)) for the first communication, and has a second radiating near-field region 641.

The third antenna element transmits a third wireless signal of the first frequency band and the second frequency band for the first communication, and has a third radiating near-field region 642.

The fourth antenna element transmits a fourth wireless signal of the fourth frequency band, which hereinafter will be understood as 2.4 gigahertz (GHz) and the fifth frequency band, which hereinafter will be understood as 5 GHz, for the second communication, and has a fourth radiating near-field region 643.

The fifth antenna element transmits a fifth wireless signal of the fourth frequency band and the fifth frequency band for the second communication, and has a fifth radiating near-field region 644.

According to one embodiment, when the electronic device 400 performs the second communication by using one or more antenna elements in a carrier aggregation (CA) state in which the first communication is performed with two or more frequency bands by using two or more antenna elements, an SAR value may increase by an overlap of frequency bands. For example, since the high band frequency of LTE communication is 2.3 to 2.7 GHz, when an antenna element that transmits a wireless signal of the high band frequency of the LTE and an antenna element that transmits a wireless signal of 2.4 GHz of the WiFi communication are positioned in proximity to each other, the frequency bands may overlap with each other in the radiating near-field regions of the two antenna elements.

For example, the first antenna element transmits a first wireless signal of the second frequency band of the first communication, and the third antenna element transmits a third wireless signal of the first frequency band of the first communication. In such a case, when the fourth antenna element transmits a fourth wireless signal of the fourth frequency band for the second communication, the first frequency band of the third antenna element and the fourth frequency band of the fourth antenna element may overlap with each other in a region 650 where the third radiating near-field region 642 of the third antenna element and the fourth radiating near-field region 643 of the fourth antenna element overlap with each other, causing the SAR value of the electronic device 400 to increase.

For example, the first antenna element transmits a first wireless signal of the second frequency band of the first communication, and the third antenna element transmits a second wireless signal of the first frequency band of the first communication. In such a case, when the fifth antenna element transmits a fifth wireless signal of the fourth frequency band for the second communication, the first frequency band of the second antenna element and the fourth frequency band of the fifth antenna element may with overlap each other in a region 651 where the second radiating near-field region 641 of the second antenna element and the fifth radiating near-field region 644 of the fifth antenna element overlap with each other. By the overlap, the SAR value of the electronic device 400 may increase.

For example, the first antenna element transmits a wireless signal of the second frequency band of the first communication, the second antenna element transmits a wireless signal of the first frequency band of the first communication, and the third antenna element transmits a wireless signal of the first frequency band of the first communication. In such a case, when the fourth antenna element transmits a wireless signal of the fourth frequency band for the second communication, and the fifth antenna element transmits a wireless signal of the fourth frequency band for the second communication, the first frequency band of the third antenna element and fourth frequency band of the fourth antenna element may overlap with each other in a region 650 where the third radiating near-field region 642 of the third antenna element and the fourth radiating near-field region 643 of the fourth antenna element overlap with each other. In addition, the first frequency band of the second antenna element and the fourth frequency band of the fifth antenna element may overlap with each other in a region 651 where the second radiating near-field region 641 of the second antenna element and the fifth radiating near-field region 644 of the fifth antenna element overlap with each other, causing the SAR value of the electronic device 400 to increase.

According to one embodiment, when the electronic device 400 performs the first communication by using one or more antenna elements in a CA state in which the first communication is performed with two or more frequency bands by using two or more antenna elements, the SAR value may increase by an overlap of frequency bands. For example, when two antenna elements, which transmit wireless signals of the middle band frequency of the LTE communication, are positioned in proximity to each other, the frequency bands of the two antenna elements may overlap with each other in a region where the radiating near-field regions of the antenna elements overlap with each other.

For example, the first antenna element transmits a first wireless signal of the second frequency band of the first communication, and the third antenna element transmits a third wireless signal of the first frequency band of the first communication. In such a case, when the second antenna element transmits a second wireless signal of the second frequency band for the first communication, the second frequency band of the first antenna element and the second frequency band of the first antenna element may overlap with each other in a region 652 where the first radiating near-field region 640 of the first antenna element and the second radiating near-field region 641 of the second antenna element overlap with each other, causing the SAR value of the electronic device 400 to increase.

According to one embodiment, when the electronic device 400 performs the second communication by using one or more antenna elements in a CA state in which the first communication and the second communication are performed with two or more frequency bands by using two or more antenna elements, the SAR value may increase by an overlap of frequency bands. For example, when two antenna elements, which transmit wireless signals of the fourth frequency band of the WiFi communication, are positioned in proximity to each other, the SAR value of the electronic device 400 may increase in a region where the radiating near-field regions of the two antenna elements overlap with each other.

For example, the first antenna element transmits a first wireless signal of the second frequency band of the first communication, and the fourth antenna element transmits a wireless signal of the fourth frequency band for the second communication. In such a case, when the fifth antenna element transmits a wireless signal of the fourth frequency band for the second communication, the fourth frequency band (e.g., 2.4 GHz) of the fourth antenna element and the fourth frequency band of the fifth antenna element may overlap with each other in a region 653 where the fourth radiating near-field region 643 of the fourth antenna element and the fifth radiating near-field region 644 of the fifth antenna element overlap with each other, causing the SAR value of the electronic device 400 to increase.

Figure 7A:
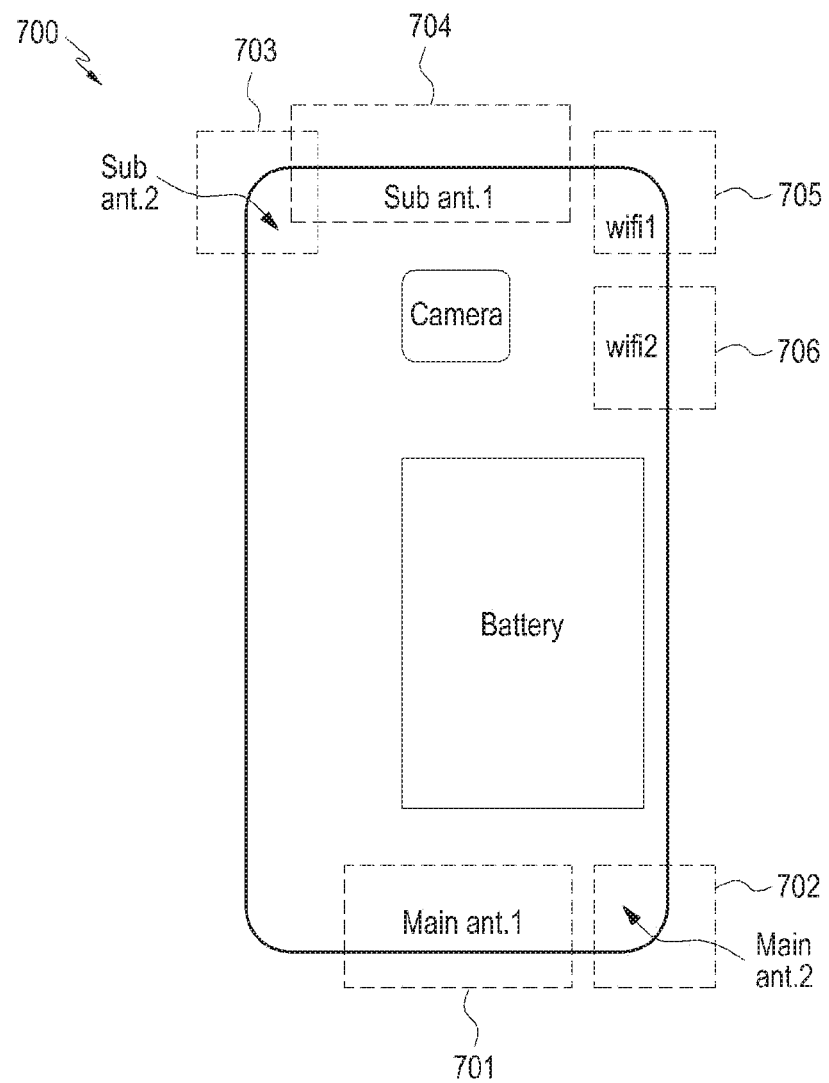
FIGS. 7A, 7B and 7C illustrate the positions of a plurality of antenna elements included in an electronic device according to embodiments of the present disclosure.
Figure 7B:
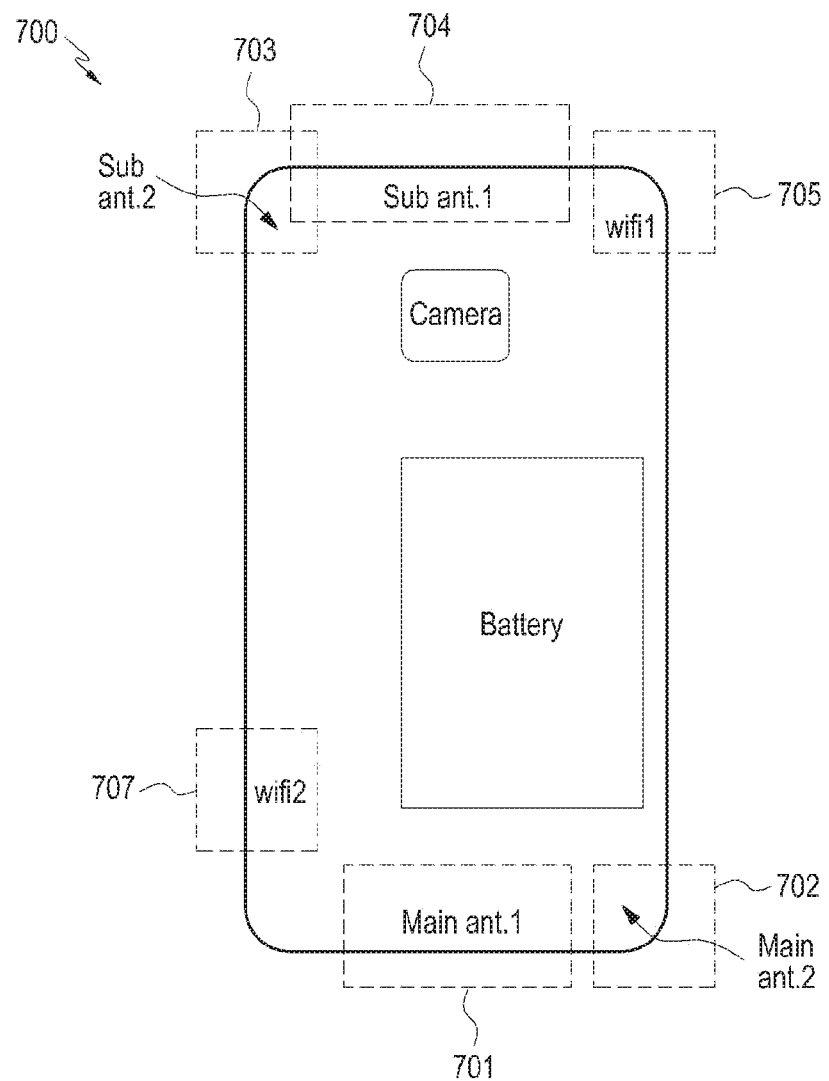
Figure 7C:
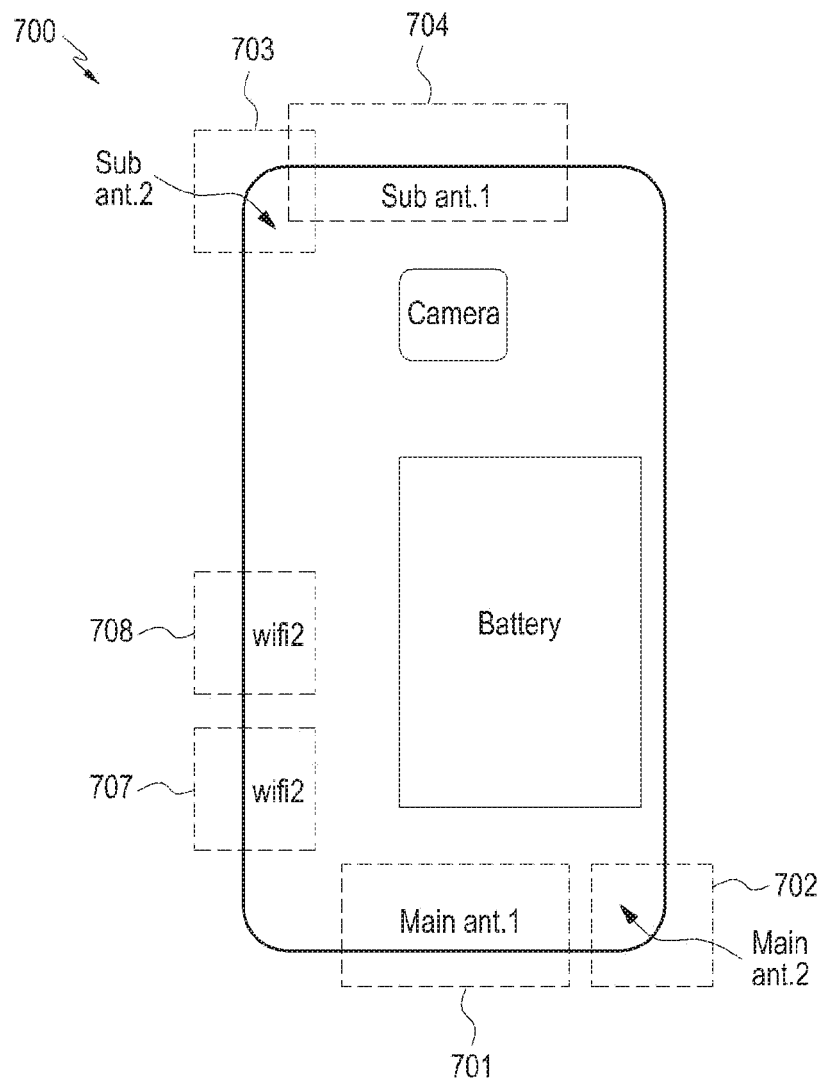

FIGS. 7A, 7B and 7C illustrate the positions of a plurality of antenna elements included in an electronic device according to embodiments of the present disclosure.

Referring to FIG. 7A, within the housing of the electronic device, main antenna elements (e.g., a first antenna element (Main ant. 1) and a second antenna element (Main ant. 2)) may be positioned in or near the lower end portion 701 or 702 of the longitudinal direction, and sub-antenna elements (e.g., a third antenna element (Sub ant. 1) and a fourth antenna element (Sub ant. 2)) for the first communication and antenna elements (e.g., a fifth antenna element (wifi1) and a sixth antenna element (wifi2)) may be positioned in or near the upper end portion 703, 704, 705, or 706. According to embodiments, the electronic device 700 may be the same as, or similar to, the electronic device 400 illustrated in FIG. 4, the electronic device 500 illustrated in FIG. 5, or the electronic device 600 illustrated in FIGS. 6A, 6B and 6C.

For example, the first antenna element (Main ant. 1) positioned in the lower end portion 701 transmits or receive a wireless signal in any one frequency band among the low frequency band and the middle frequency band for the first communication. The second antenna element (Main ant. 2) positioned in or near the lower end portion 702 transmits or receives a wireless signal in any one frequency band among the middle frequency band and the high frequency band for the first communication. The third antenna element (Sub ant. 1) positioned in or near the upper end portion 704 transmits or receives a wireless signal in any one frequency band among the middle frequency band and the high frequency band for the first communication. The fourth antenna element (Sub ant. 2) positioned in or near the upper end portion 703 transmits or receives a wireless signal in any one frequency band among the low frequency band and the middle frequency band for the first communication. The fifth antenna element (wifi1) positioned in or near the upper end portion 705 transmits or receives a wireless signal in any one frequency band among the middle frequency band and the high frequency band for the first communication. The sixth antenna element (wifi2) positioned in or near the first side face 706 transmits or receive a wireless signal in any one frequency band among the frequency bands of 2.4 GHz and 5 GHz for the second communication.

According to embodiments, the sixth antenna element (wifi2) may be positioned in or near the second side face 707, as illustrated in FIG. 7B. Alternatively, the sixth antenna element (wifi2) may be included within the housing.

According to embodiments, the fifth antenna element (wifi1) may be positioned in or near the upper end 708 of the sixth antenna element (wifi2) that is positioned in the second side face 707, as illustrated in FIG. 7C.

In embodiments, positions (or proximity thereof) of a plurality of antenna elements illustrated in FIGS. 7A, 7B and 7C have been described. However, the antenna elements may be implemented in or near various positions, and are not limited by the above-described embodiments of the present disclosure. For example, the plurality of antenna elements may be variably located at or near a position depending on a mounting condition of a product, a product concept (e.g., supporting of dual WiFi, supporting of two or more transmission (Tx) CAs, or supporting of three or more Tx CAs), or a product design.

Figure 8A:
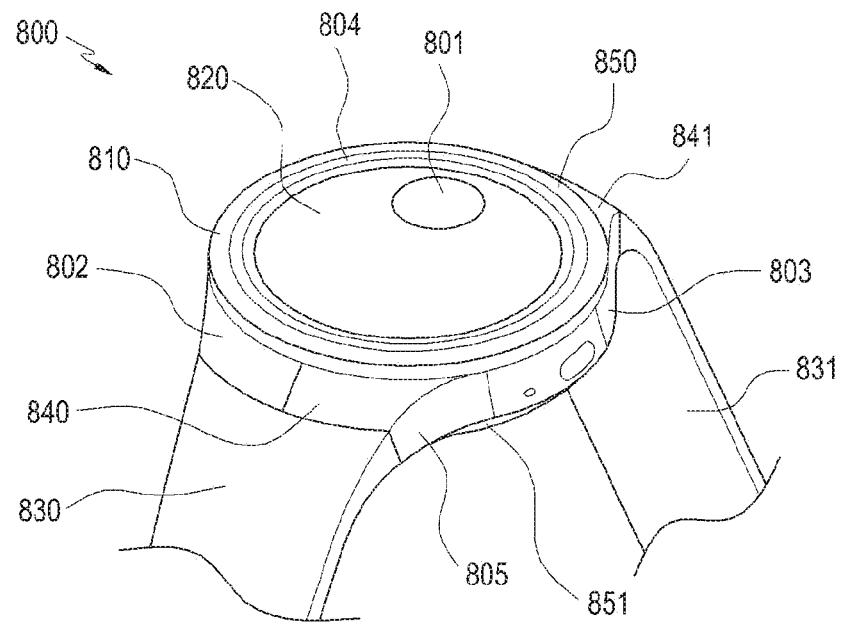
FIGS. 8A and 8B illustrate the positions of a plurality of antenna elements in a wearable electronic device according to embodiments of the present disclosure.
Figure 8B:
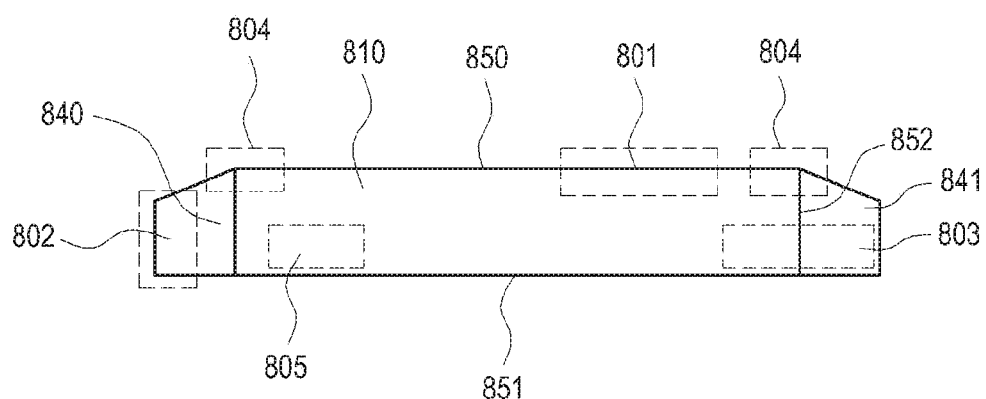

FIGS. 8A and 8B illustrate the positions of a plurality of antenna elements in a wearable electronic device according to embodiments of the present disclosure.

Referring to FIGS. 8A and 8B, a wearable electronic device 800 may include a housing 810, a display 820, straps 830 and 831, and strap connection parts 840 and 841 that interconnect the housing 810 and the two straps 830 and 831. According to embodiments, the wearable electronic device 800 may be the same as, or similar to, the electronic device 400 illustrated in FIG. 4, the electronic device 500 illustrated in FIG. 5, the electronic device 600 illustrated in FIGS. 6A, 6B and 6C, or the electronic device 700 illustrated in FIGS. 7A, 7B and 7C.

The housing 810 may include a first face 850 that includes a display positioned thereon and faces in a first direction, a second face 851 that faces in a second direction that is opposite to, or different from, the first direction, and a third face 852 that encloses at least a portion of a space between the first face 850 and the second face 851.

The first strap connection part 840 may be positioned on a first portion of the third face 852, and the second strap connection part 841 may be positioned on a second portion that is positioned to be opposite to, or different from, the first portion of the third face 852.

According to one embodiment, the wearable electronic device 800 may include a first antenna unit that is positioned in or near at least a portion 801 of a first portion in which the display 820 is positioned in the inside of the housing 810, a second antenna unit that is positioned in or near a first portion 802 of a the first strap connection part in the inside of the first strap connection part 840, a third antenna unit that is positioned in or near at least a portion 803 of a second portion of the housing 810 and the third portion of the second strap connection part 841 in the inside of the housing 810 and the second strap connection part 841, a fourth antenna unit that is positioned in or near a periphery 804 of a shield region along the rim of the display 820 in the inside of the housing 810, or a fifth antenna unit that is positioned in or near at least a portion 805 of a second face 851 of the housing 810 in the inside of the housing 810.

Figure 9:
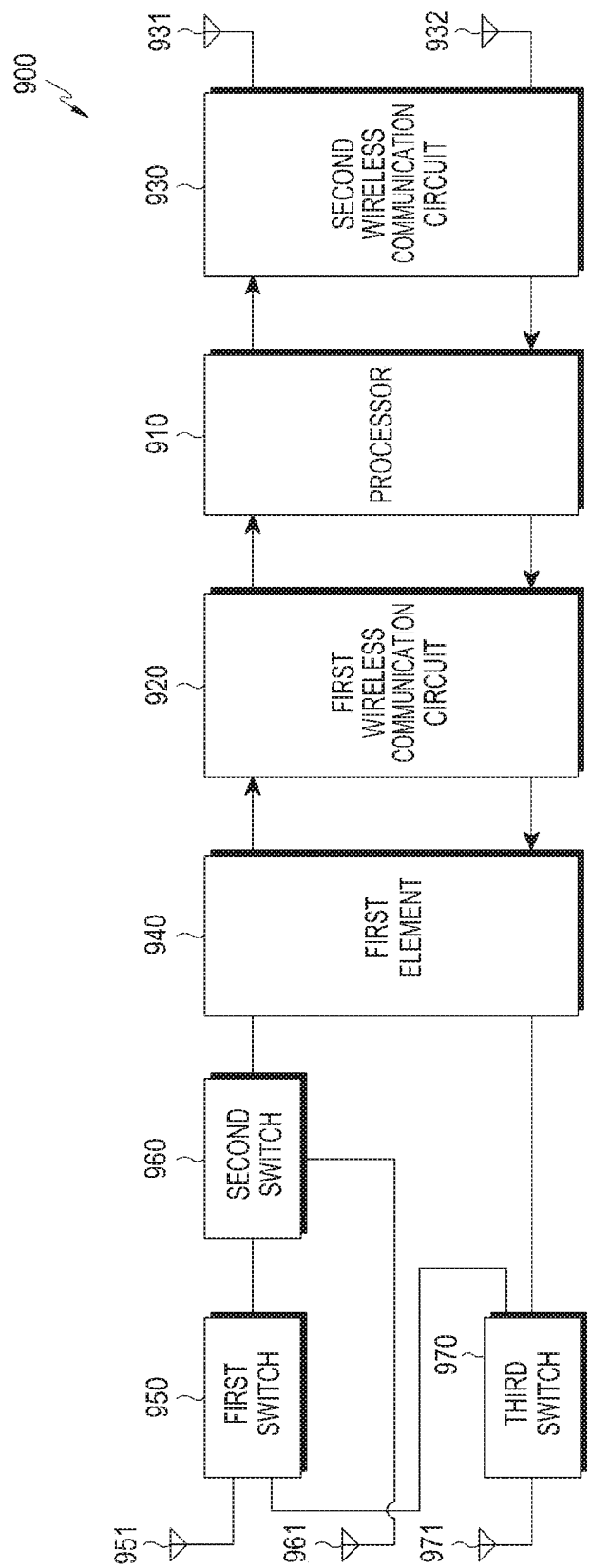
FIG. 9 is a block diagram of an electronic device including five (5) antenna elements according to embodiments of the present disclosure.

FIG. 9 is a block diagram of an electronic device including five (5) antenna elements according to embodiments of the present disclosure.

Referring to FIG. 9, the electronic device 900 may include a processor 910, a first wireless communication circuit 920, a second wireless communication circuit 930, a first element 940, a first switch 950, a second switch 960, a third switch 970, a first antenna element 951, a second antenna element 961, a third antenna element 971, a fourth antenna element 931, or a fifth antenna element 932. According to embodiments, the electronic device 900 may be the same as, or similar to, the electronic device 400 illustrated in FIG. 4, the electronic device 500 illustrated in FIG. 5, the electronic device 600 illustrated in FIGS. 6A, 6B and 6C, the electronic device 700 illustrated in FIGS. 7A, 7B and 7C, or the wearable electronic device 800 illustrated in FIGS. 8A and 8B.

According to embodiments, the electronic device 900 may include three antenna elements 951, 961, and 971 for the first communication and two antenna elements 931 and 932 for the second communication.

According to one embodiment, the first antenna element 951 is connected to the first switch 950 and may output a wireless signal of a second frequency band or a third frequency band for the first communication, which is transferred through the first switch 950.

According to one embodiment, the second antenna element 961 is connected to the second switch 960 and may output a wireless signal of a first frequency band or a second frequency band for the first communication, which is transferred through the second switch 960.

According to one embodiment, the third antenna element 971 is connected to the third switch 970 and may output a wireless signal of a second frequency band or a first frequency band for the first communication, which is transferred through the third switch 970.

According to various embodiments, the first antenna element 951, the second antenna element 961, or the third antenna element 971 may output a wireless signal of at least one of the first frequency band, the second frequency band, and the third frequency band.

According to one embodiment, the first switch 950 is connected to the first antenna element 951, the second switch 960, and the third switch 970, and may transfer a wireless signal of the second frequency band or the third frequency band, which is transferred through the second switch 960, to the first antenna element 951. For example, the first switch 950 may be a single pole double throw (SPDT). According to embodiments, the first switch 950 may transfer a wireless signal of the first frequency band or the second frequency band, which is transferred through the second switch 960, to the third switch 970.

According to one embodiment, the second switch 960 is connected to the first element 940, the second antenna element 961, and the first switch 950, and may transfer a wireless signal of the first frequency band or the second frequency band, which is transferred through the first element 940, to the second antenna element 961. For example, the second switch 960 may be a double pole double throw (DPDT).

According to various embodiments, the second switch 960 may transfer a wireless signal of the first frequency band or the third frequency band to the first switch 950.

According to one embodiment, the third switch 970 is connected to the first element 940, the first switch 950, and the third antenna element 971, and may transfer a wireless signal of the first frequency band or the second frequency band, which is transferred through the first element 940 or the first switch 950, to the third antenna element 971. For example, the second switch 970 may be a double pole single throw (DPST). According to various embodiments, the third switch 970 may transfer a wireless signal of the first frequency band or the second frequency band, which is transferred through the first element 940, to the third antenna element 971.

According to one embodiment, the first element (e.g., an amplification element or an amplification circuit) 940 may include a power amplification module (PAM), a front end module (FEM), or a duplexer module, and may amplify a wireless signal, which is received from the first wireless communication circuit 920 depending on the frequency band thereof (e.g., low frequency band, middle frequency band, high frequency band). For example, the first element 940 may transfer a wireless signal of the first frequency band or the third frequency band to the third switch 970.

According to one embodiment, the first wireless communication circuit 920 may include a transceiver and a call processor, and may be connected to the processor 910 and the first element (e.g., an amplification element or an amplification circuit) 940 to transmit or receive a wireless signal for the first communication. For example, the first wireless communication circuit 920 may be an LTE radio frequency integrated circuit (LTE RFIC).

According to one embodiment, the second wireless communication circuit 930 may include a transceiver, and may be connected to the processor 910 and a plurality of antenna elements 931 and 932 to transmit a wireless signal for the second communication through the plurality of antenna elements 931 and 932. For example, the second wireless communication circuit 930 may be an Industrial Scientific and Medical equipment radio frequency integrated circuit (ISM RFIC).

According to one embodiment, the fourth antenna element 931 and the fifth antenna element 932 may output a wireless signal of at least one of the fourth frequency band and the fifth frequency band for the second communication.

According to one embodiment, the processor (e.g., an Application Processor (AP)) 910 may control general operations of the first wireless communication circuit 920, the second wireless communication circuit 930, the first element 940, the first switch 950, the second switch 960, the third switch 970, and the plurality of antenna elements 931, 932, 951, 961, and 971.

According to one embodiment, the processor 910 is connected to the first wireless communication circuit (e.g., LTE RFIC) 920 and the second wireless communication circuit (e.g., ISM RFIC) 930, and may control the first wireless communication circuit 920 to transmit or receive a wireless signal for the first communication through at least one of the first antenna element 951, the second antenna element 961, and the third antenna element 971. The processor 910 may control the second wireless communication circuit 930 to receive a wireless signal for the second communication through at least one of the fourth antenna element 931 and the fifth antenna element 932.

According to one embodiment, the processor 910 may control the connection and use of the plurality of antenna elements 931, 932, 951, 961, and 971. The processor 910 may determine an operation for each of the plurality of antenna elements 931, 932, 951, 961, and 971 depending on the state of each of the plurality of antenna elements 931, 932, 951, 961, and 971.

According to one embodiment, the processor 910 may at least partially simultaneously control the first wireless communication circuit 920 and the second wireless communication circuit 930 in order to simultaneously perform the first communication and the second communication.

According to one embodiment, the processor 910 may control the first wireless communication circuit 920 to transmit a wireless signal of the third frequency band or the second frequency band through the first antenna element 951. For example, a wireless signal of the third frequency band or the second frequency band may be transferred from the first element 940 to the first antenna element 951 through the second switch 960 and the first switch 950 to be transmitted through the first antenna element 951.

According to one embodiment, the processor 910 may control the first wireless communication circuit 920 to transfer a wireless signal of the first frequency band or the second frequency band through the second antenna element 961.

For example, a wireless signal of the first frequency band or the second frequency band may be transferred from the first element 940 to the second antenna element 961 through the second switch 960 and the first switch 950 to be transmitted through the second antenna element 961.

According to one embodiment, the processor 910 may control the first wireless communication circuit 920 to transmit a wireless signal of the second frequency band or the first frequency band through the third antenna element 971.

For example, a wireless signal of the second frequency band or the first frequency band may be transferred from the first wireless communication circuit 920 to the third antenna element 971 through first element 940, the second switch 960, the first switch 950, and the third switch 970 to be transmitted through the third antenna element 971.

For example, a wireless signal of the second frequency band or the first frequency band may be transferred from the first wireless communication circuit 920 to the third antenna element 971 through the first element 940 and the third switch 970 to be transmitted through the third antenna element 971.

According to one embodiment, the processor 910 may sense the activation of a specific antenna element while communication is performed through a plurality of antenna elements. For example, the processor 910 may sense the activation of the fourth antenna element 931 for the second communication during the transmission/reception of a wireless signal through the first antenna element 951 and the third antenna element 971 for the first communication. In such a case, the processor 910 may determine whether it is a multi-communication situation in which the first communication and the second communication are simultaneously performed, and when it is determined that it is a multi-communication situation, the processor 910 may confirm the frequency bands for the activated antenna elements. The processor 910 may determine whether overlapping or neighboring frequency bands, which hereinafter could also be neighboring frequency bands, exist among the confirmed frequency bands, and when overlapping or neighboring frequency bands exist, the processor 910 may switch at least one of the antenna elements of the overlapping or neighboring frequency bands to an antenna element of a frequency band that does not overlap or neighbor. When a distance between the frequency bands is less than a threshold value, the processor 910 may determine that the frequency bands are the neighboring frequency bands.

For example, the first antenna element 951 may be positioned in the lower end portion 601 of FIGS. 6A and 6B, the second antenna element 961 may be positioned in the lower end portion 602 of FIGS. 6A and 6B, the second antenna element 971 may be positioned in the upper end portion 603 of FIGS. 6A and 6B, the second antenna element 931 may be positioned in the upper end portion 604 of FIGS. 6A and 6B, and the fifth antenna element 932 may be positioned in the side face 605 of FIGS. 6A and 6B.

The processor 910 may sense the activation of the fourth antenna element 931 that is capable of transmitting a wireless signal of the fourth frequency band while a wireless signal of the second frequency band is transmitted through the first antenna element 951 and a wireless signal of the first frequency band is transmitted through the third antenna element 971.

Since the first frequency band and the fourth frequency band overlap with (or neighbor) each other, the third antenna element 971, which transmits a wireless signal of the first frequency band, and the fourth antenna element 931, which transmits a wireless signal of the fourth frequency band overlap with or neighbor each other in the frequency band so that the SAR value may increase.

The processor 910 may control the first wireless communication circuit 920 such that a wireless signal of the first frequency band is transferred to the second antenna element 961 through the second switch 960 and then transmitted through the second antenna element 961. The processor 910 may control the first wireless communication circuit 920 such that a wireless signal of the second frequency band is transferred to the first antenna element 951 through the second switch 960 and the first switch 950 and then transmitted through the first antenna element 951.

Thus, even if a wireless signal of the fourth frequency band is transmitted through the fourth antenna element 931, the frequency band of the third antenna element 971 and the frequency band of the fourth antenna element 931 do not overlap with each other so that an increase in the SAR value of the electronic device 900 may be reduced or suppressed.

According to various embodiments, the processor 910 may sense the activation of the fourth antenna element 931 that is capable of transmitting a wireless signal of the fourth frequency band while a wireless signal of the first frequency band is transmitted through the third antenna element 971 and a wireless signal of the second frequency band is transmitted through the second antenna element 961. Since the fourth frequency band and the first frequency band overlap with (or neighbor) each other, the third antenna element 971, which transmits a wireless signal of the first frequency band, and the fourth antenna element 931, which transmits a wireless signal of the fourth frequency band overlap with or neighbor each other in a frequency band so that the SAR value may increase.

The processor 910 may control the first wireless communication circuit 920 such that a wireless signal of the first frequency band is transferred to the first antenna element 951 through the second switch 960 and the first switch 950, and then transmitted through the first antenna element 951. Thus, even if a wireless signal of the fourth frequency band is transmitted through the fourth antenna element 931, the frequency band of the third antenna element 971 and the frequency band of the fourth antenna element 931 do not overlap with each other so that an increase in the SAR value of the electronic device 900 may be reduced or suppressed.

According to various embodiments, the processor 910 may sense the activation of the fifth antenna element 932 that is capable of transmitting a wireless signal of the fourth frequency band while a wireless signal of the first frequency band is transmitted through the first antenna element 951 and a wireless signal of the first frequency band is transmitted through the second antenna element 961.

Since the fourth frequency band and the first frequency band overlap with (or neighbor) each other, the second antenna element 961, which transmits a wireless signal of the first frequency band, and the fifth antenna element 932, which transmits a wireless signal of the fourth frequency band, overlap with (or neighbor) each other in the frequency band so that the SAR value may increase.

The processor 910 may control the first wireless communication circuit 920 such that a wireless signal of the first frequency band is transferred to the third antenna element 971 through the second switch 960, the first switch 950, and the third switch 970, and then transmitted through the first antenna element 951. The processor 910 may control the first wireless communication circuit 920 such that a wireless signal of the second frequency band is transferred to the first antenna element 951 through the second switch 960 and the first switch 950, and then transmitted through the first antenna element 951. Thus, even if a wireless signal of the fourth frequency band is transmitted through the fifth antenna element 932, the frequency band of the second antenna element 961 and the frequency band of the fifth antenna element 932 do not overlap with each other so that an increase in the SAR value of the electronic device 900 may be reduced or suppressed.

According to various embodiments, the processor 910 may sense the activation of the fifth antenna element 932 that is capable of transmitting a wireless signal of the fourth frequency band while a wireless signal of the second frequency band is transmitted through the third antenna element 971 and a wireless signal of the first frequency band is transmitted through the second antenna element 961.

Since the fourth frequency band and the first frequency band overlap with (or neighbor) each other, the second antenna element 961, which transmits a wireless signal of the first frequency band, and the fifth antenna element 932, which transmits a wireless signal of the fourth frequency band, overlap with or neighbor each other in the frequency band so that the SAR value may increase.

The processor 910 may control the first wireless communication circuit 920 such that a wireless signal of the first frequency band is transferred to the first antenna element 951 through the second switch 960 and the first switch 950, and then transmitted through the first antenna element 951.

Thus, even if a wireless signal of the fourth frequency band is transmitted through the fifth antenna element 932, the frequency band of the second antenna element 961 and the frequency band of the fifth antenna element 932 do not overlap with each other so that an increase in the SAR value of the electronic device 900 may be reduced or suppressed.

According to embodiments, the processor 910 may sense the activation of a specific antenna element while communication is performed through a plurality of antenna elements.

For example, the processor 910 may sense the activation of the fourth antenna element 931 for the second communication during the transmission/reception of a wireless signal through the first antenna element 951, the second antenna element 961, and the third antenna element 971 for the first communication. In such a case, the processor 910 may determine whether it is a multi-communication situation in which the first communication and the second communication are performed simultaneously, and when it is determined that it is a multi-communication situation, the processor 910 may confirm the frequency bands for the activated antenna elements. The processor 910 may determine whether overlapping or neighboring frequency bands exist among the confirmed frequency bands, and when it is determined that overlapping or neighboring frequency bands exist, the processor 910 may switch at least one of the antenna elements of the overlapping or neighboring frequency bands to an antenna element of a frequency band that does not overlap or neighbor.

The processor 910 may sense the activation of the fourth antenna element 931 that is capable of transmitting a wireless signal of the fourth frequency band while a wireless signal of the third frequency band is transmitted through the first antenna element 951, a wireless signal of the second frequency band is transmitted through the second antenna element 961, and a wireless signal of the first frequency band is transmitted through the third antenna element 971.

Since the fourth frequency band and the first frequency band overlap with (or neighbor) each other, the third antenna element 971, which transmits a wireless signal of the first frequency band, and the fourth antenna element 931, which transmits a wireless signal of the fourth frequency band overlap with or neighbor each other in the frequency band so that the SAR value may increase.

The processor 910 may control the first wireless communication circuit 920 such that a wireless signal of the first frequency band is transferred to the second antenna element 961 through the second switch 960, and then transmitted through the second antenna element 961. Alternatively, the processor 910 may control the first wireless communication circuit 920 such that a wireless signal of the first frequency band is transferred to the first antenna element 951 through the second switch 960 and the first switch 950, and then transmitted through the first antenna element 951. The processor 910 may control the first wireless communication circuit 920 such that a wireless signal of the second frequency band is transferred to the third antenna element 971 through the second switch 960, the first switch 950, and the third switch 970, and then transmitted through the third antenna element 971.

Thus, even if a wireless signal of the fourth frequency band is transmitted through the fourth antenna element 931, the frequency band of the third antenna element 971 and the frequency band of the fourth antenna element 931 do not overlap with each other so that an increase in the SAR value of the electronic device 900 may be reduced or suppressed.

According to various embodiments, the processor 910 may sense the activation of the fifth antenna element 932 that is capable of transmitting a wireless signal of the fourth frequency band while a wireless signal of the second frequency band is transmitted through the third antenna element 971, a wireless signal of the first frequency band is transmitted through the second antenna element 961, and a wireless signal of the third frequency band is transmitted through the first antenna element 951.

Since the fourth frequency band and the first frequency band overlap with or neighbor each other, the second antenna element 961, which transmits a wireless signal of the first frequency band, and the fifth antenna element 932, which transmits a wireless signal of the fourth frequency band overlap with or neighbor each other in the frequency band so that the SAR value may increase.

The processor 910 may control the first wireless communication circuit 920 such that a wireless signal of the first frequency band is transferred to the third antenna element 971 through the second switch 960, the first switch 950, and the third switch 970, and then transmitted through the first antenna element 951. Alternatively, the processor 910 may control the first wireless communication circuit 920 such that a wireless signal of the first frequency band is transferred to the first antenna element 951 through the second switch 960 and the first switch 950, and then transmitted through the first antenna element 951. The processor 910 may control the first wireless communication circuit 920 such that a wireless signal of the second frequency band is transferred to the second antenna element 961 through the second switch 960. Thus, even if a wireless signal of the fourth frequency band is transmitted through the fifth antenna element 932, the frequency band of the second antenna element 961 and the frequency band of the fifth antenna element 932 do not overlap with each other so that an increase in the SAR value of the electronic device 900 may be reduced or suppressed.

According to various embodiments, although descriptions have been made on the case where the activation of one or more antennas for the second communication is sensed while a plurality of antenna elements for first communication transmit or receive a wireless signal, the present disclosure is not limited thereto. The above-described method may also be used when the activation of an antenna element for the first communication while one or more antenna elements for the first communication and one or more antenna elements for the second communication transmit/receive a wireless signal.

According to various embodiments, the processor 910 may sense the activation of a specific antenna element while communication is performed through a plurality of antenna elements. For example, the processor 910 may sense the activation of the fourth antenna element 931 for the second communication during the transmission/reception of a wireless signal through the third antenna element 971 and the second antenna element 961 for the first communication. The processor 910 may confirm whether each of the antenna elements is activated based on the communication information that is set to correspond to each of the antenna elements. The communication information may include the type of communication, a frequency band, a communication schedule, or a duplexing method. In such a case, the processor 910 may confirm whether the activated antenna elements are positioned within a short distance in relation to each other, and, when it is confirmed that the activated antenna elements are positioned within a short distance, the processor 910 may confirm the frequency bands for the activated antenna elements, which are positioned within a short distance in relation to each other. The processor 910 may determine whether overlapping or neighboring frequency bands exist among the confirmed frequency bands, and when it is determined that overlapping or neighboring frequency bands exist, the processor 910 may switch at least one of the antenna elements, which are positioned within a short distance, to an antenna element which is not positioned within a short distance in relation to each other.

For example, the processor 910 may determine whether the activated third antenna element 971, second antenna element 961, and fourth antenna element 931 are positioned within a short distance in relation to each other. A short distance may be a distance between antenna elements which may increase the SAR value by frequency band overlapping. For example, when the antenna elements are positioned within a short distance in relation to each other, the SAR value due to the overlap may increase, and when the antenna elements are not positioned within a short distance, the SAR value by the overlap may decrease.

When the third antenna element 971 and the fourth antenna element 931 are positioned within a short distance, the processor 910 may confirm the frequency bands of the third antenna element 971 and the fourth antenna element 931.

When the confirmed frequency band of the third antenna element 971 is the first frequency band of the first communication, and the confirmed frequency band of the fourth antenna element 931 is the fourth frequency band of the second communication, the processor 910 may determine that the frequency band of the third antenna element 971 and the frequency band of the fourth antenna element 931 overlap with each other.

In such a case, the processor 910 may perform a control such that the third antenna element 971 operates as the second antenna element 961, which is not positioned within a short distance in relation to the fourth antenna element 931, and the second antenna element 961 operates as the third antenna element 971. For example, the processor 910 may perform a control such that the operation of the third antenna element 971 and the operation of the second antenna element 961 are switched to each other so that the third antenna element 971 transfers the frequency band of the second antenna element 961 and the second antenna element 961 transfers the frequency band of the third antenna element 971.

For example, the electronic device 900 may perform an operation for avoiding frequency band overlapping based on set information that is set as in Table 1 below.

TABLE 1

| Antenna activation sensing | Whether antennas within short distance are activated | Operation according to frequency band overlap | Related system |
|---|---|---|---|
| LTE Tx | — | Maintain | Electronic device |
| LTE Tx | WiFi | Switching with another switchable LTE Tx antenna (e.g., activated antenna); Switching with another switchable LTE Tx antenna (e.g., non-activated antenna) and/or switching to another switchable WiFi antenna | Electronic device |
| LTE Tx | LTE Tx | Switching with another switchable LTE Tx antenna (e.g., activated antenna) and/or switching with another switchable LTE Tx antenna (e.g., non-activated antenna) | Electronic device |
| WiFi | — | Maintain | Electronic device |
| WiFi | LTE Tx | Switching with another switchable WiFi Tx antenna (e.g., activated antenna) and/or Switching with another switchable WiFi Tx antenna (e.g., non-activated antenna) | Electronic device |
| WiFi | WiFi | Switching with another switchable WiFi Tx antenna (e.g., non-activated antenna) and/or Switching with another switchable WiFi Tx antenna (e.g., non-activated antenna) | Electronic device |

Thus, even if a wireless signal is transmitted or received through the fourth antenna element 931, the electronic device 900 does not suffer from frequency band overlapping or neighboring between the fourth antenna element 931 and the third antenna element 971 so that an increase in the SAR value of the electronic device 900 may be reduced or suppressed.

According to embodiments, the processor 910 may change the frequency band of an antenna element for the second communication in order to reduce or suppress an increase in the SAR value in the multi-communication situation.

For example, the processor 910 may sense the activation of the fourth antenna element 931 for the second communication during the transmission/reception of a wireless signal through the third antenna element 971 and the second antenna element 961 for the first communication. In such a case, the processor 910 may determine whether it is a multi-communication situation in which the first communication and the second communication are simultaneously performed, and when it is determined that it is a multi-communication situation, the processor 910 may confirm the frequency bands for the activated antenna elements. The processor 910 may determine whether overlapping or neighboring first and second communication frequency bands exist among the confirmed frequency bands. When overlapping or neighboring first and second communication frequency bands exist, the processor 910 may control the second wireless communication circuit 930 to switch the second communication frequency band, which overlaps with or neighbors the first communication frequency band, to the second communication frequency band, which does not overlap with or neighbor the first frequency band.

For example, the processor 910 may sense the activation of the fourth antenna element 931 that is capable of transmitting a wireless signal of the fourth frequency band while a wireless signal of the first frequency band is transmitted through the third antenna element 971 and a wireless signal of the second frequency band is transmitted through the second antenna element 961.

The processor 910 may determine whether it is a multi-communication situation, and when it is a multi-communication situation, the processor 910 may confirm the frequency bands of the third antenna element 971, the second antenna element 961, and the fourth antenna element 931 in order to determine whether there are antenna elements that have overlapping or neighboring frequency bands. In such a case, since the first frequency band and the fourth frequency band are overlapping or neighboring frequency bands, the processor 910 may determine the third antenna element 971 and the fourth antenna element 931 as the antenna elements that have overlapping or neighboring frequency bands.

The processor 910 may control the second wireless communication circuit 930 to change the fourth frequency band of the fourth antenna element 931 to the fifth frequency band. As a result, since the first frequency band of the third antenna element 971 does not overlap with the changed fifth frequency band, it is possible to reduce or suppress an increase in the SAR value of the electronic device.

According to various embodiments, the processor 910 may determine whether the frequency bands of antenna elements positioned within a short distance overlap with each other among the frequency bands of activated antenna elements, and may switch, among the overlapping frequency bands, the second communication frequency band to a second communication frequency band that does not overlap with the frequency bands.

For example, the processor 910 may sense the activation of the fourth antenna element 931 for the second communication during the transmission/reception of a wireless signal through the third antenna element 971 and the second antenna element 961 for the first communication. The processor 910 may confirm whether each of the antenna elements is activated based on the communication information that is set to correspond to each of the antenna elements.

In such a case, the processor 910 may determine whether the activated fourth antenna element 931, third antenna element 971, and second antenna element 961 are positioned within a short distance, and may confirm the frequency bands for the activated antenna elements that are positioned within a short distance. The processor 910 may determine whether overlapping or neighboring frequency bands exist among the confirmed frequency bands. When overlapping or neighboring frequency bands exist, the processor 910 may switch, among the overlapping or neighboring frequency bands, the second communication frequency band to a second communication frequency band that does not overlap with or neighbor the frequency bands.

For example, the processor 910 may determine whether the activated third antenna element 971, second antenna element 961, and fourth antenna element 931 are positioned within a short distance in relation to each other.

When the third antenna element 971 and the fourth antenna element 931 are positioned within a short distance, the processor 910 may confirm the frequency bands of the third antenna element 971 and the fourth antenna element 931.

When the confirmed frequency band of the third antenna element 971 is the first frequency band of the first communication, and the confirmed frequency band of the fourth antenna element 931 is the fourth frequency band of the second communication, the processor 910 may determine that the frequency band of the third antenna element 971 and the frequency band of the fourth antenna element 931 overlap with each other. In such a case, the processor 910 may control the second wireless communication circuit 930 to change the fourth frequency band of the fourth antenna element 931 to the fifth frequency band of the second communication that does not overlap with the first frequency band of the first frequency band, and to transmit a wireless signal of the fifth frequency band.

For example, the electronic device 900 may perform an operation for avoiding frequency band overlapping based on set information that is set as in Table 2 below.

or neighbor each other, the processor 910 may control the second wireless communication circuit 930 to switch (or change) the second communication channel among the overlapping or neighboring frequency channels to a second communication frequency channel that has a far spacing (e.g., a distance between communication frequency channels (e.g., Hz, KHz, MHz, or GHz) from a frequency domain. For example, the spacing may be a distance between antenna elements which may increase or reduce the SAR value by the overlap of frequency bands. As the spacing between the frequency bands decreases, the SAR value by overlapping may increase, and as the spacing between the frequency bands increases, the SAR value by overlapping may decrease.

For example, the processor 910 may sense the activation of the fourth antenna element 931 for the second communication during the transmission/reception of a wireless signal through the third antenna element 971 and the second antenna element 961 for the first communication. The processor 910 may confirm whether the activated antenna elements are positioned within a short distance in relation to each other, and, when it is confirmed that the activated antenna elements are positioned within a short distance in relation to each other, the processor 910 may confirm the frequency bands for the activated antenna elements, which are positioned within a short distance in relation to each other.

When the third antenna element 971 and the fourth antenna element 931 are positioned adjacent to each other, the processor 910 may determine whether the frequency channel of the third antenna element 971, which hereinafter will be understood as 2.42 GHz, and the frequency channel the fourth antenna element 931. When the frequency channel of the third antenna element 971 and the frequency channel of the fourth antenna element 931 overlap with each other, the processor 910 may control the second wireless communication circuit 930 to switch (or change) the frequency channel of the third antenna element 931 to a frequency

TABLE 2

| Antenna activation sensing | Whether antennas within short distance are activated | Operation according to frequency band overlap | Related system |
|---|---|---|---|
| WiFi | LTE Tx | Switching to another changeable WiFi frequency band | Electronic device, AP |
| WiFi | WiFi | Switching to another changeable WiFi frequency band | Electronic device, AP |
| LTE Tx | WiFi | Switching to another changeable WiFi frequency band | Electronic device, AP |

Thus, even if a wireless signal is transmitted or received through the fourth antenna element 931, the electronic device 900 does not suffer from frequency band overlapping or neighboring between the fourth antenna element 931 and the third antenna element 971 so that an increase in the SAR value of the electronic device 900 may be reduced or suppressed.

According to various embodiments, the processor 910 may determine whether, among the frequency channels of the activated antenna elements, the frequency channels of antenna elements, which are positioned within a short distance, overlap with or neighbor each other. When the frequency channels of the antenna elements, which are positioned within a short distance with each other, overlap with channel (e.g., 3.0 GHz or less) that has a large spacing from the frequency channel of the fourth antenna element 971.

As the spacing between two frequency channels increases (or becomes farther), the increase of an SAR value by overlapping or neighboring between frequency bands decreases. Thus, the processor 910 may change the frequency channel of the fourth antenna element 931 to a frequency channel of 3.0 GHz or less that has a far (or large) spacing from the frequency channel of the third antenna element 971.

For example, the electronic device 900 may perform an operation for avoiding frequency band overlapping based on set information that is set as in Table 3 below.

TABLE 3

| Antenna activation sensing | Whether antennas within short distance are activated | Operation according to frequency band overlap | Related system |
|---|---|---|---|
| WiFi | LTE Tx | Switching to WiFi frequency channel having a large spacing distance from frequency domain | Electronic device, AP |
| WiFi | WiFi | Switching to WiFi frequency channel having a large spacing distance from frequency domain | Electronic device, AP |
| LTE Tx | WiFi | Switching to WiFi frequency channel having a large spacing distance from frequency domain | Electronic device, AP |

Thus, even if a wireless signal is transmitted or received through the fourth antenna element 931, the electronic device 900 does not suffer from frequency band overlapping or neighboring between the fourth antenna element 931 and the third antenna element 971 so that an increase in the SAR value of the electronic device 900 may be reduced or suppressed.

According to various embodiments, the processor 910 may change the frequency band of an antenna element for the first communication in order to reduce or suppress an increase in the SAR value in the multi-communication situation.

For example, the processor 910 may sense the activation of the fourth antenna element 931 for the second communication during the transmission/reception of a wireless signal through the third antenna element 971 and the second antenna element 961 for the first communication. In such a case, the processor 910 may determine whether it is a multi-communication situation in which the first communication and the second communication are simultaneously performed, and when it is determined that it is a multi-communication situation, the processor 910 may confirm the frequency bands for the activated antenna elements. The processor 910 may determine whether overlapping or neighboring frequency bands exist among the confirmed frequency bands. When overlapping or neighboring first and second communication frequency bands exist, the processor 910 may control the first wireless communication circuit 920 to switch the first communication frequency band, which overlaps with or neighbors the second communication frequency band, to the first communication frequency band, which does not overlap with or neighbor the second frequency band. In such a case, the processor 910 may transfer, to a base station, a request for performing communication with the first communication frequency band, which does not overlap with or neighbor the second communication frequency band.

For example, the processor 910 may sense the activation of the fourth antenna element 931 that is capable of transmitting a wireless signal of the fourth frequency band while a wireless signal of the first frequency band is transmitted through the third antenna element 971 and a wireless signal of the second frequency band is transmitted through the second antenna element 961.

The processor 910 may determine whether it is a multi-communication situation, and when it is a multi-communication situation, the processor 910 may confirm the frequency bands of the third antenna element 971, the second antenna element 961, and the fourth antenna element 931 in order to determine whether there are antenna elements that have overlapping or neighboring frequency bands. In such a case, since the first frequency band and the fourth frequency band are overlapping or neighboring frequency bands, the processor 910 may determine the third antenna element 971 and the fourth antenna element 931 as the antenna elements that have overlapping or neighboring frequency bands.

The processor 910 may control the first wireless communication circuit 920 to change the first frequency band of the third antenna element 971 to the second frequency band, which does not overlap with the fourth frequency band, and may transfer, to the base station, a request for performing communication with the changed second frequency band. As a result, since the changed second frequency band of the third antenna element 971 does not overlap with the fourth frequency band of the fourth antenna element 931, it is possible to reduce or suppress an increase in the SAR value of the electronic device.

According to various embodiments, when the activation of the fourth antenna element 931 for the second communication occurs during the transmission/reception of a wireless signal through the third antenna element 971 and the second antenna element 961 for the first communication, the processor 910 may confirm (or determine) whether activated antenna elements are positioned within a short distance in relation to each other. When the activated antenna elements are positioned within a short distance in relation to each other, the processor 910 may confirm the frequency bands of the activated antenna elements, which are positioned within a short distance in relation to each other. The processor 910 may determine whether overlapping or neighboring frequency bands exist among the confirmed frequency bands. When overlapping or neighboring frequency bands exist, the processor 910 may control the first wireless communication circuit 920 to switch (or change), among the overlapping or neighboring frequency bands, the first communication frequency band to a first communication frequency band that does not overlap with or neighbor the other frequency bands.

For example, the processor 910 may determine whether the activated third antenna element 971, second antenna element 961, and fourth antenna element 931 are positioned within a short distance in relation to each other.

When the third antenna element 971 and the fourth antenna element 931 are positioned within a short distance, the processor 910 may confirm the frequency bands of the third antenna element 971 and the fourth antenna element 931.

When the confirmed frequency band of the third antenna element 971 is the first frequency band of the first communication, and the confirmed frequency band of the fourth antenna element 931 is the fourth frequency band of the second communication, the processor 910 may determine that the frequency band of the third antenna element 971 and the frequency band of the fourth antenna element 931 overlap with each other. In such a case, the processor 910 may change the first frequency band of the third antenna element 971 to the third frequency band (e.g., low frequency band, 1.0 GHz or less) of the first communication that does not overlap with the fourth frequency band. The processor 910 may control the first wireless communication circuit 920 to transmit a wireless signal of the changed third frequency band. The processor 910 may transfer, to a base station, a request for performing the first communication with the changed third frequency band in order to request that the base station transmit/receive a wireless signal of the third frequency band to/from the electronic device 900.

For example, the electronic device 900 may perform an operation for avoiding frequency band overlapping based on set information that is set as in Table 4 below.

TABLE 4

| Antenna activation sensing | Whether antennas within short distance are activated | Operation according to frequency band overlap | Related system |
|---|---|---|---|
| LTE Tx | WiFi | Switching to another changeable LTE frequency band | Electronic device, AP |
| LTE Tx | LTE Tx | Switching to another changeable LTE frequency band | Electronic device, Base station |
| LTE Tx | 3G | Switching to another changeable LTE frequency band and/or switching to another changeable 3G frequency band | Electronic device, Base station |
| 3G | WiFi | Switching to another changeable 3G frequency band | Electronic device, Base station |
| 3G | LTE Tx | Switching to another changeable 3G frequency band and/or switching to another changeable LTE frequency band | Electronic device, Base station |
| 3G | 3G | Switching to another changeable 3G frequency band | Electronic device, Base station |
| WiFi | LTE Tx | Switching to another changeable LTE frequency band | Electronic device, Base station |
| WiFi | 3G | Switching to another changeable 3G frequency band | Electronic device, Base station |

Thus, even if a wireless signal is transmitted or received through the fourth antenna element 931, the electronic device 900 does not suffer from frequency band overlapping or neighboring between the fourth antenna element 931 and the third antenna element 971 so that an increase in the SAR value of the electronic device 900 may be reduced or suppressed.

According to various embodiments, the processor 910 may determine whether, among the frequency channels of the activated antenna elements, the frequency channels of antenna elements, which are positioned within a short distance, overlap with each other. When the frequency channels (bands) of the antenna elements, which are positioned within a short distance, overlap with each other, the processor 910 may control the first wireless communication circuit 920 to switch, among the overlapping or neighboring frequency channels, the first communication frequency channel to a first communication frequency channel that has a far spacing from the frequency domain.

For example, the processor 910 may sense the activation of the fourth antenna element 931 for the second communication during the transmission/reception of a wireless signal through the third antenna element 971 and the second antenna element 961 for the first communication. The processor 910 may confirm whether the activated antenna elements are positioned within a short distance in relation to each other, and, when it is confirmed that the activated antenna elements are positioned within a short distance in relation to each other, the processor 910 may confirm the frequency bands for the activated antenna elements, which are positioned within a short distance in relation to each other.

When the third antenna element 971 and the fourth antenna element 931 are positioned adjacent to each other, the processor 910 may determine whether the frequency channel of the third antenna element 971 and the frequency channel of the fourth antenna element 931. When the frequency channel of the third antenna element 971 and the frequency channel of the fourth antenna element 931 overlap with each other, the processor 910 may control the first wireless communication circuit 920 to switch (or change) the frequency channel of the third antenna element 971 to a frequency channel (e.g., 2.0 GHz or less) that has a far spacing from the frequency channel of the fourth antenna element 931.

As the spacing between two frequency channels increases, the increase of an SAR value by overlapping or neighboring between frequency bands decreases. Thus, the frequency 910 may change the frequency channel of the third antenna element 971 to a frequency channel of 2.0 GHz or less that has a far spacing from the frequency channel of the fourth antenna element 931.

For example, the electronic device 900 may perform an operation for avoiding frequency band overlapping based on set information that is set as in Table 5 below.

TABLE 5

| Antenna activation sensing | Whether antennas within short distance are activated | Operation according to frequency band overlap | Related system |
|---|---|---|---|
| LTE Tx | WiFi | Switching to LTE channel having large spacing distance from frequency band and/or switching to LTE frequency band having large spacing distance from frequency band | Electronic device, Base station |
| LTE Tx | LTE Tx | Switching to LTE channel having large spacing distance from frequency band and/or switching to LTE frequency band having large spacing distance from frequency band | Electronic device, Base station |
| LTE Tx | 3G | Switching to LTE channel having large spacing distance from frequency domain; Switching to LTE frequency band having large spacing distance from frequency domain; Switching to 3G channel having large spacing distance from frequency domain; and/or Switching to 3G frequency band having large spacing distance from frequency domain | Electronic device, Base station |
| 3G | WiFi | Switching to 3G channel having large spacing distance from frequency domain and/or switching to 3G frequency band having large spacing distance from frequency domain | Electronic device, Base station |
| 3G | LTE Tx | Switching to 3G channel having large spacing distance from frequency domain; Switching to 3G frequency band having large spacing distance from frequency domain; Switching to LTE channel having large spacing distance from frequency domain; and/or Switching to LTE frequency band having large spacing distance from frequency domain | Electronic device, Base station |
| 3G | 3G | Switching to 3G channel having large spacing distance from frequency domain and/or switching to 3G frequency band having large spacing distance from frequency domain | Electronic device, Base station |
| WiFi | LTE Tx | Switching to LTE channel having large spacing distance from frequency domain | Electronic device, Base station |
| WiFi | 3G | Switching to LTE frequency band having large spacing distance from frequency domain | Electronic device, Base station |

Thus, even if a wireless signal is transmitted or received through the fourth antenna element 931, the electronic device 900 does not suffer from frequency band overlapping or neighboring between the fourth antenna element 931 and the third antenna element 971 so that an increase in the SAR value of the electronic device 900 may be reduced or suppressed.

The frequency bands described in embodiments are not limited to the numerical values thereof, and any one of the first communication frequency band and the second communication frequency band may be changed to various frequency bands (e.g., band 1 to band 44) that do not overlap with the other of the first communication frequency band and the second communication frequency band.

Figure 10:
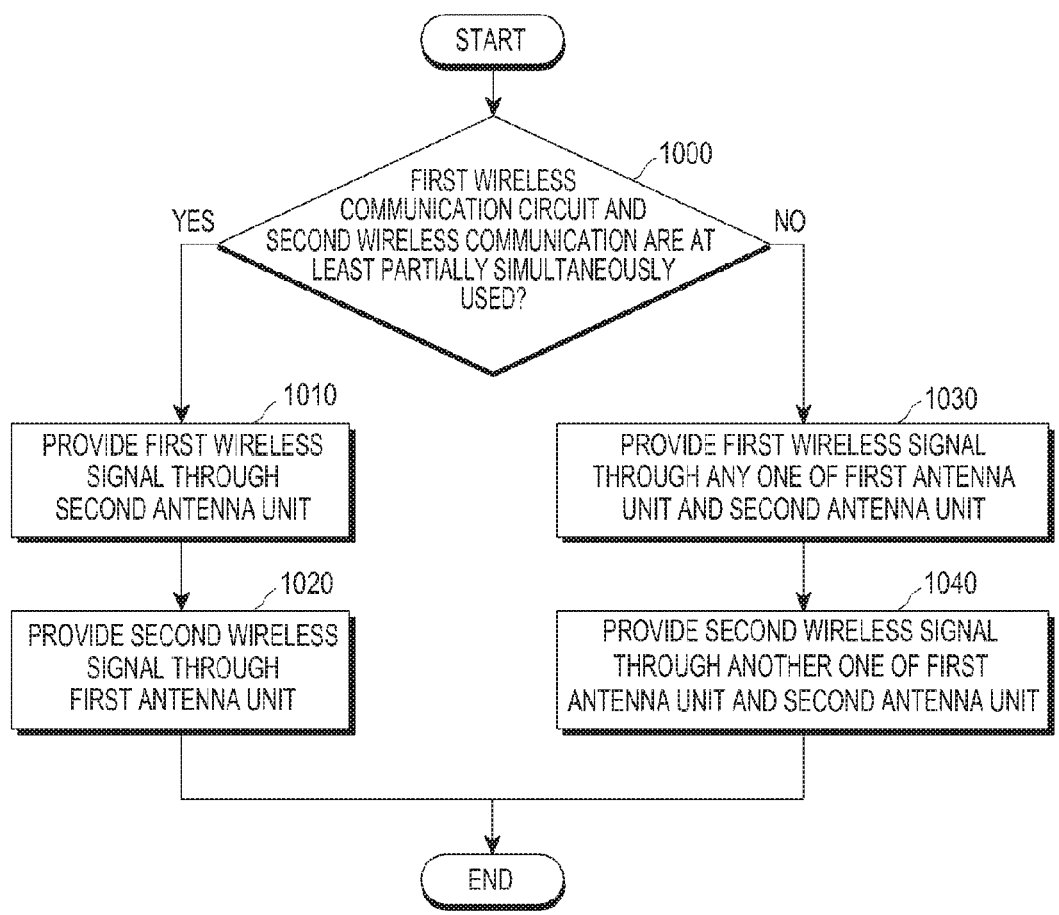
FIG. 10 illustrates operations for managing an SAR by frequency overlapping between antenna elements under a multi-communication situation of an electronic device according to embodiments of the present disclosure.

FIG. 10 illustrates operations for managing an SAR by frequency band overlapping between a plurality of antenna elements under a multi-communication situation of an electronic device according to embodiments of the present disclosure.

According to various embodiments, steps 1000 to 1040 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIG. 10, in step 1000, the electronic device 900 determines whether the first wireless communication circuit 920 and the second wireless communication circuit 930 are at least partially simultaneously used. When the first wireless communication circuit 920 and the second wireless communication circuit 930 are at least partially simultaneously used, the electronic device 900 performs step 1010, and when the first wireless communication circuit 920 and the second wireless communication circuit 930 are not at least partially simultaneously used, the electronic device 900 may perform step 1030.

According to one embodiment, the electronic device 900 may determine whether it is a multi-communication situation in which the first communication is performed using the first wireless communication circuit 920 and the second communication is performed using the second wireless communication circuit 930. When it is a multi-communication situation, step 1010 may be performed, and when it is not a multi-communication situation, step 1030 may be performed.

For example, when the first wireless communication circuit 920 and the second wireless communication circuit 930 are at least partially simultaneously used, the electronic device 900 may determine that it is a multi-communication situation.

In step 1010, the electronic device 900 may provide a first wireless signal through the second antenna unit.

For example, when there is an antenna element of the second communication frequency band that overlaps with the first communication frequency band, the electronic device 900 may control the first wireless communication circuit 920 to output, through the second antenna element 961, a first wireless signal of the first frequency band (e.g., LTE middle frequency band or low frequency band) that does not overlap with the second frequency band.

In step 1020, the electronic device 900 may provide a second wireless signal through the first antenna unit (e.g., the first antenna element 951).

For example, the electronic device 900 may control the first wireless communication circuit 920 to output, through the first antenna element 951, a second wireless signal of the first communication frequency band (e.g., LTE middle frequency band or low frequency band) that does not overlap with the second frequency band.

In step 1030, the electronic device 900 may provide a first wireless signal through any one of the first antenna unit (e.g., the first antenna element 951) and the second antenna unit (e.g., the second antenna element 961).

For example, when it is not a multi-communication situation, the electronic device 900 may control the first wireless communication circuit 920 to output, through any one of the first antenna element 951 and the second antenna element 961, a first wireless signal of the first communication frequency band (e.g., at least one of low frequency band, middle frequency band, and high frequency band).

In step 1040, the electronic device 900 may provide a second wireless signal through the other one of the first antenna unit (e.g., the first antenna element 951) and the second antenna unit (e.g., the second antenna element 961).

For example, when it is not a multi-communication situation, the electronic device 900 may control the first wireless communication circuit 920 to output, through the other one of the first antenna element 951 and the second antenna element 961, a second wireless signal of the first communication frequency band (e.g., at least one of low frequency band, middle frequency band, and high frequency band).

Figure 11:
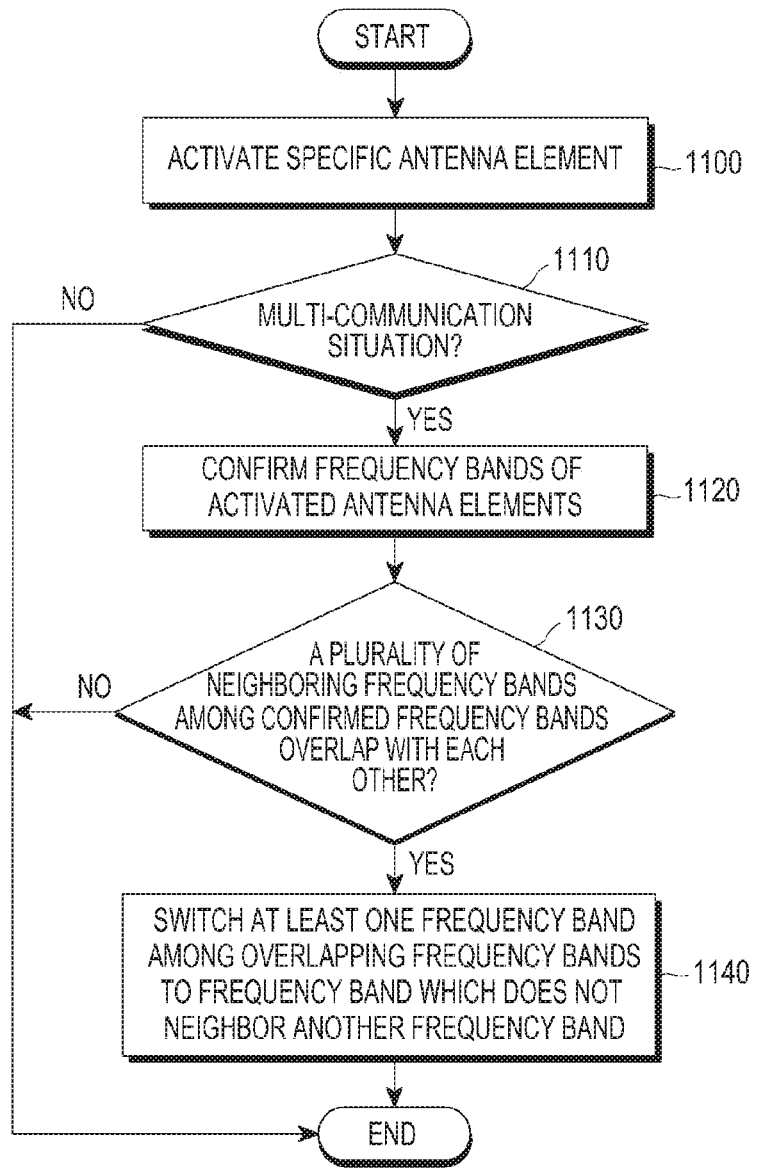
FIG. 11 illustrates operations for managing an SAR by frequency overlapping between antenna elements under a multi-communication situation of an electronic device according to embodiments of the present disclosure.

FIG. 11 illustrates operations for managing an SAR by frequency overlapping between antenna elements under a multi-communication situation of an electronic device according to embodiments of the present disclosure.

According to various embodiments, steps 1100 to 1140 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIG. 11, in step 1100, the electronic device 900 may activate a specific antenna element. For example, the electronic device 900 may activate at least one antenna element for the first communication or the second communication.

In step 1110, the electronic device 900 may determine whether it is a multi-communication situation in which the first communication and the second communication are performed simultaneously. When it is a multi-communication situation, the electronic device 900 may perform step 1120, and when it is not a multi-communication situation, the electronic device 900 may terminate the operation.

For example, the electronic device 900 may sense the activation of the fourth antenna element 931 that is capable of transmitting a wireless signal of the fourth frequency band of the second communication while a wireless signal of the first frequency band of the first communication is transmitted through the third antenna element 971 and a wireless signal of the second frequency band of the first communication is transmitted through the second antenna element 961. In such a case, the electronic device 900 may determine that it is a multi-communication situation.

In step 1120, the electronic device 900 may confirm the frequency bands of a plurality of activated antenna elements. For example, the electronic device 900 may determine each of the frequency bands of the third antenna element 971, second antenna element 961, and fourth antenna element 931.

In step 1130, the electronic device 900 determines whether a plurality of neighboring frequency bands among the confirmed frequency bands overlap with each other. When the plurality of neighboring frequency bands overlap with each other, the electronic device 900 may perform step 1140, and when the frequency bands do not overlap with each other, the electronic device 900 may terminate the operation.

For example, the electronic device 900 may determine whether the first frequency band of the third antenna element 971 and the fourth frequency band of the fourth antenna element 931, which is adjacent to the first frequency band of the third antenna element 971, overlap with each other.

In step 1140, the electronic device 900 may switch at least one frequency band among overlapping frequency bands to a frequency band that is not adjacent to another frequency band.

For example, the first frequency band (e.g., high frequency band, 2.3 to 2.7 GHz) and the fourth frequency band may include a frequency band that overlap with (or neighbor) each other. In such a case, the electronic device 900 may switch the first frequency band of the third antenna element 971 to the second frequency band of the second antenna element that is not adjacent (close) to the fourth frequency band.

Accordingly, the electronic device 900 transmits a wireless signal of the first frequency band through the second antenna element 961 and a wireless signal of the second frequency band through the third antenna element 971 so that frequency band overlapping between the first frequency band of the third antenna element 971 and the fourth frequency band of the fourth antenna element 931 can be avoided.

Figure 12:
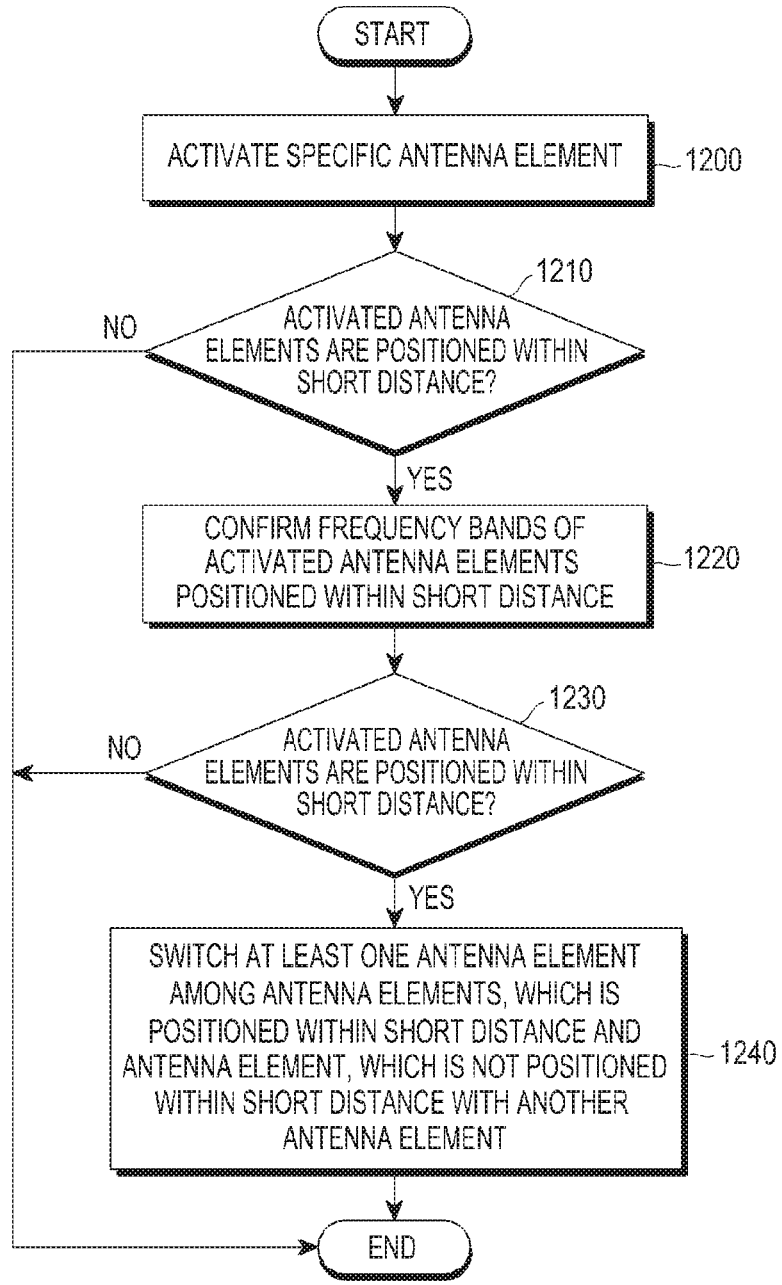
FIG. 12 illustrates operations for managing an SAR by frequency overlapping between neighboring antenna elements in an electronic device according to embodiments of the present disclosure.

FIG. 12 illustrates operations for managing an SAR by frequency overlapping between neighboring antenna elements in an electronic device according to embodiments of the present disclosure.

According to various embodiments, steps 1200 to 1240 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIG. 12, in step 1200, the electronic device 900 may activate a specific antenna element. For example, the electronic device 900 may activate at least one antenna element for the first communication or the second communication.

In step 1210, the electronic device 900 may confirm whether activated antenna elements are positioned within a short distance in relation to each other. When activated antenna elements are positioned within a short distance, the electronic device 900 may perform step 1220, and when activated antenna elements are not positioned within a short distance, the electronic device 900 may terminate the operation.

For example, the electronic device 900 may sense the activation of the fourth antenna element 931 for the second communication during the transmission/reception of a wireless signal through the third antenna element 971 and the second antenna element 961 for the first communication.

For example, the electronic device 900 may determine whether the activated third antenna element 971, second antenna element 961, and fourth antenna element 931 are positioned within a short distance in relation to each other.

In step 1220, the electronic device 900 may confirm the frequency bands of a plurality of activated antenna elements positioned within a short distance. For example, when the third antenna element 971 and the fourth antenna element 931 are positioned within a short distance, the electronic device 900 may confirm the frequency bands of the third antenna element 971 and the fourth antenna element 931.

In step 1230, the electronic device 900 determines whether there are overlapping frequency bands among the confirmed frequency bands. When overlapping frequency bands exist, the electronic device 900 may perform step 1240, and when overlapping frequency bands do not exist, the electronic device 900 may terminate the operation. For example, the electronic device 900 may determine whether the first frequency band of the third antenna element 971 and the fourth frequency band of the fourth antenna element 931 overlap with each other.

In step 1240, the electronic device 900 may switch at least one of the antenna elements, which are positioned within a short distance in relation to each other, to an antenna element which is not positioned within a short distance in relation to each other. For example, the first frequency band of the third antenna element 971 and the fourth frequency band of the fourth antenna element 931 may overlap with or neighbor each other. In such a case, the electronic device 90 may perform a control such that the third antenna element 971 operates as the second antenna element 961, which is not positioned within a short distance in relation to the fourth antenna element 931 and the second antenna element 961 operates as the third antenna element 931.

Accordingly, the electronic device 900 transmits a wireless signal of the first frequency band through the second antenna element 961 and a wireless signal of the second frequency band through the third antenna element 971 so that the frequency band overlapping between the third antenna element 971 and the fourth antenna element 931 can be avoided.

Figure 13:
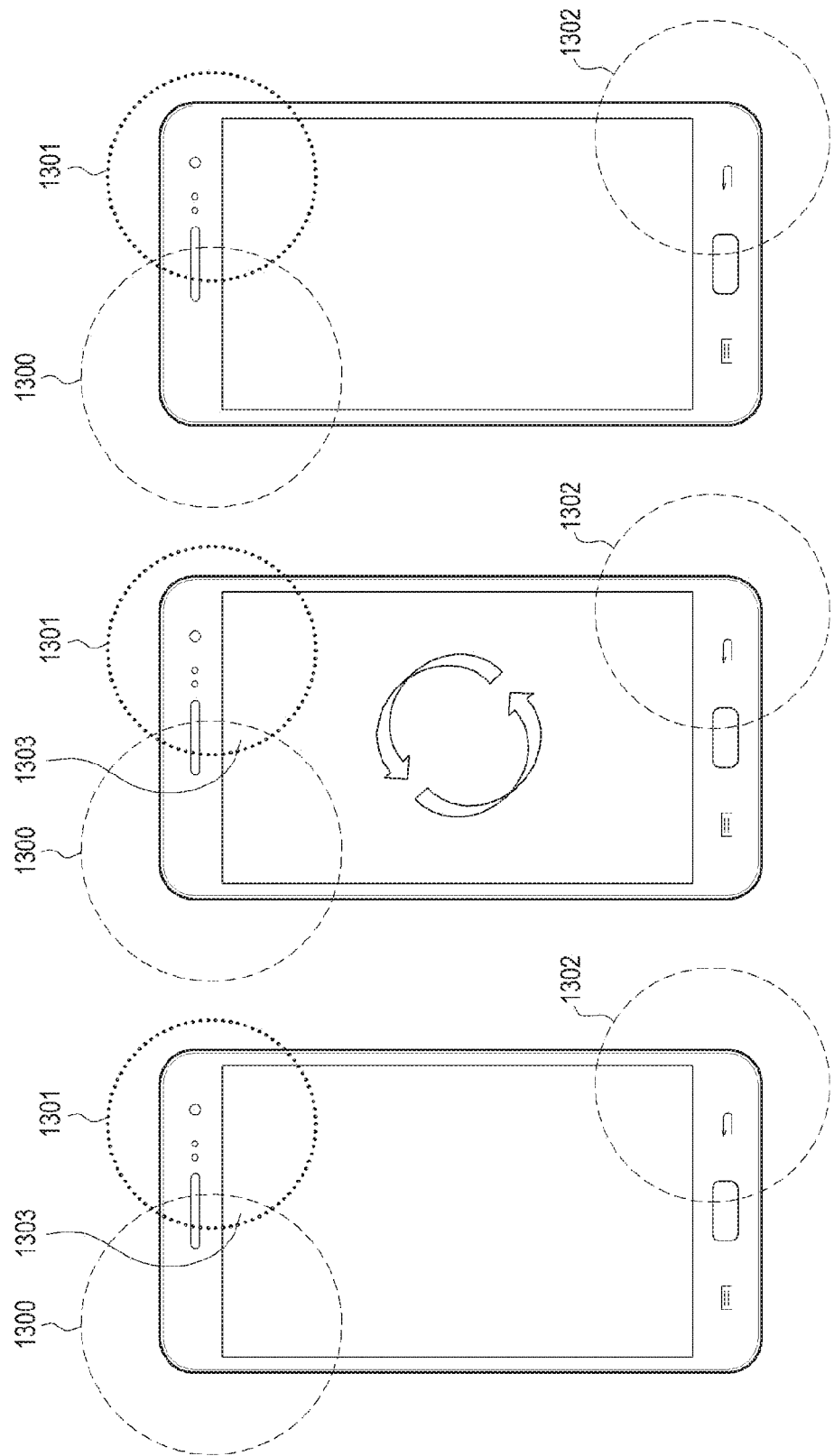
FIGS. 13A, 13B and 13C are a frequency band change among a plurality of antenna elements according to embodiments of the present disclosure.

FIGS. 13A, 13B and 13C are a frequency band change among a plurality of antenna elements according to embodiments of the present disclosure.

Referring to FIGS. 9 and 13A-13C, the electronic device 900 may activate the fourth antenna element 931 for the second communication during the transmission/reception of a wireless signal for the first communication through the third antenna element 971 and the second antenna element 961. For example, the third antenna element 971 may have a first radiating near-field region 1300, the fourth antenna element 931 may have a first radiating near-field region 1301, and the second antenna element 961 may have a third radiating near-field region 1302.

For example, when a wireless signal of the first frequency band is transmitted through the third antenna element 971 and a wireless signal of the fourth frequency band is transmitted through the fourth antenna element 931, frequency band overlapping may occur in a region 1303 where the first radiating near-field region 1300 of the third antenna element 971 and the second radiating near-field region 1301 of the fourth antenna element 931 overlap with each other. For example, as illustrated in FIG. 13B, the electronic device 900 may switch (change) the frequency band of the third antenna element 971 and the frequency band of the second antenna element 961 to each other.

Accordingly, the electronic device 900 transmits/receive, through the second antenna element 961, a wireless signal of the first frequency band that overlaps with the fourth frequency band (2.4 GHz) of the fourth antenna element 931, and transmits/receive, through the third antenna element 971, a wireless signal of the second frequency band that does not overlap with the fourth frequency band.

Accordingly, as illustrated in FIG. 13C, the frequency band overlapping can be avoided even if the first radiating near-field region 1300 of the third antenna element 971 and the second radiating near-field region 1301 of the fourth antenna element 931 overlap with each other.

Figure 14:
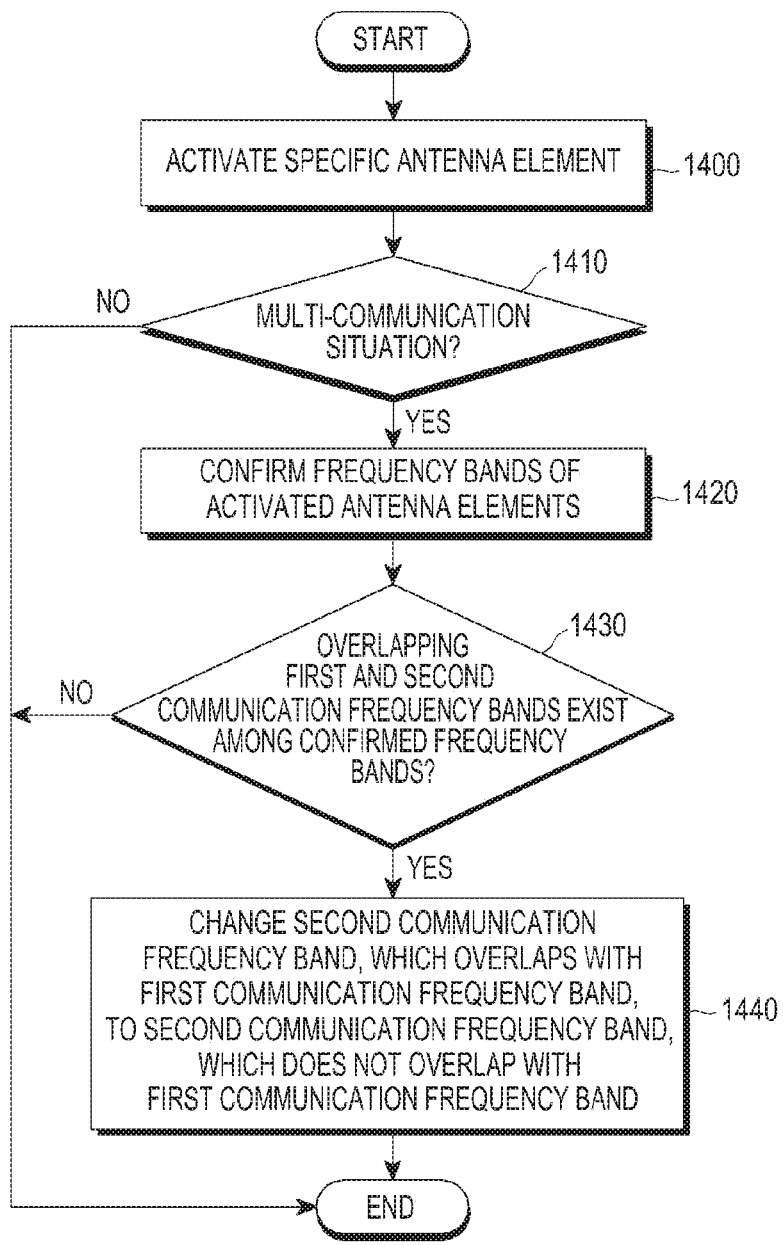
FIG. 14 illustrates operations for managing an SAR by frequency overlapping between antenna elements under a multi-communication situation of an electronic device according to embodiments of the present disclosure.

FIG. 14 illustrates operations for managing an SAR by frequency overlapping between antenna elements under a multi-communication situation of an electronic device according to embodiments of the present disclosure.

According to various embodiments, steps 1400 to 1440 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 14, the electronic device 900 may activate a specific antenna element for the first communication or the second communication, and may determine, in step 1410, whether it is a multi-communication situation in which the first communication and the second communication are simultaneously performed. When it is a multi-communication situation, the electronic device 900 may perform step 1420, and when it is not a multi-communication situation, the electronic device 900 may terminate the operation.

For example, the processor 400 may sense the activation of the fourth antenna element 931 that is capable of transmitting a wireless signal of the fourth frequency band while a wireless signal of the first frequency band is transmitted through the third antenna element 971 and a wireless signal of the second frequency band is transmitted through the second antenna element 961. In such a case, the electronic device 900 may determine that it is a multi-communication situation.

In step 1420, the electronic device 900 may confirm the frequency bands of a plurality of activated antenna elements.

For example, the electronic device 900 may determine each of the frequency bands of the third antenna element 971, second antenna element 961, and fourth antenna element 931.

In step 1430, the electronic device 900 determines whether there are overlapping first and second communication frequency bands among the confirmed frequency bands. When overlapping first and second frequency bands exist, the electronic device 900 may perform step 1440, and when overlapping frequency bands do not exist, the electronic device 900 may terminate the operation. For example, the electronic device 900 may determine whether the first frequency band of the third antenna element 971, the second frequency band of the second antenna element 961, and the fourth frequency band of the fourth antenna element 931 overlap with each other.

In step 1440, the electronic device 900 may change the second communication frequency band, which overlaps with the first communication frequency band, to the second communication frequency band that does not overlap with the first communication frequency band. For example, the first frequency band and the fourth frequency band overlap with or neighbor each other. In such a case, the electronic device 900 may change the fourth frequency band of the fourth antenna element 931 to the fifth frequency band that does not overlap with the first frequency band (e.g., 2.3 to 2.7 GHz).

Accordingly, the electronic device 900 transmits a wireless signal of the first frequency band through the third antenna element 971, a wireless signal of the second frequency band through the second antenna element 961, and a wireless signal of the fifth frequency band through the fourth antenna element 931 so that the frequency band overlapping between the third antenna element 971 and the fourth antenna element 931 can be avoided.

Figure 15:
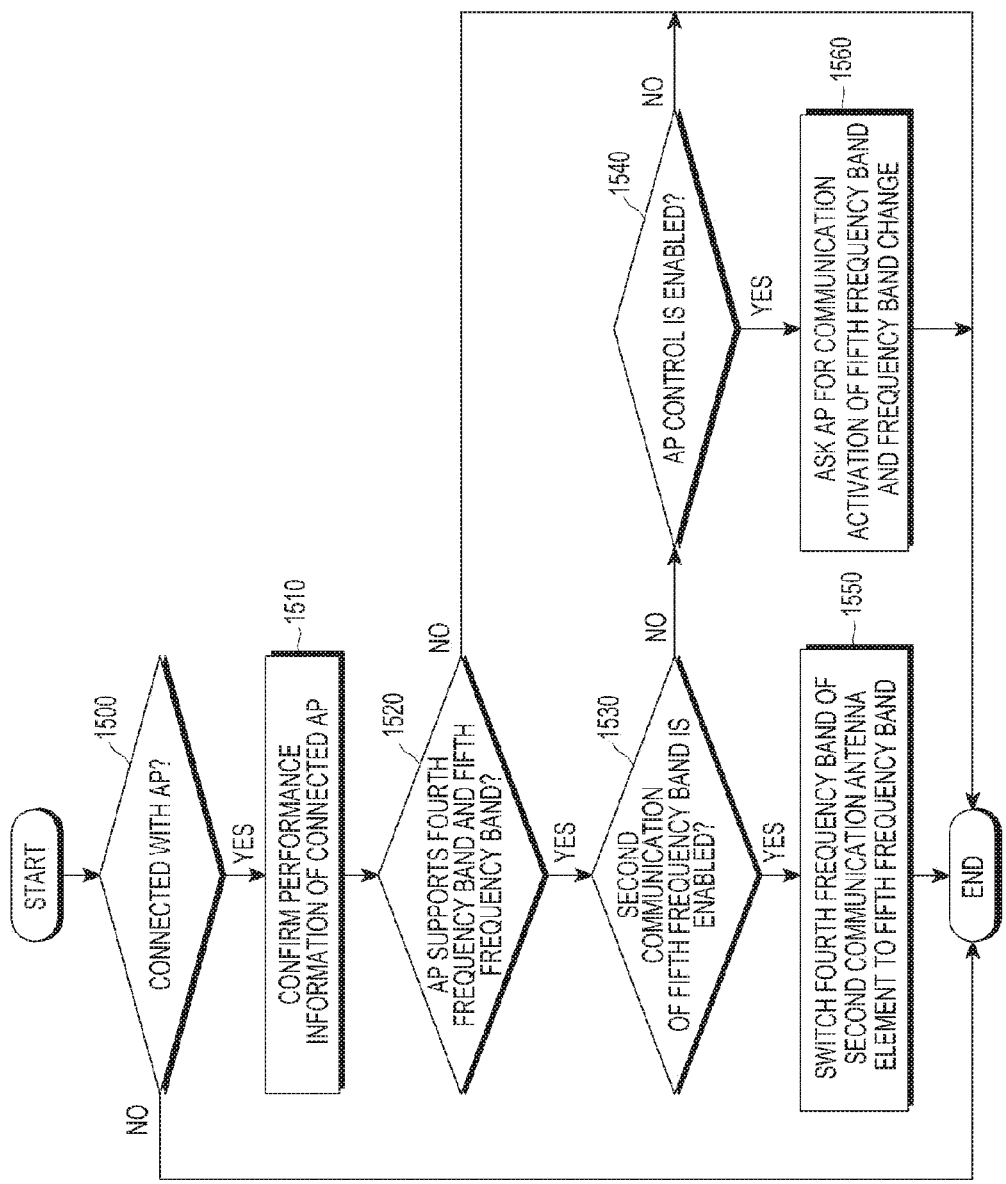
FIG. 15 illustrates operations for managing an SAR by frequency overlapping between neighboring antenna elements in an electronic device according to embodiments of the present disclosure.

FIG. 15 illustrates operations for managing an SAR by frequency overlapping between neighboring antenna elements in an electronic device according to embodiments of the present disclosure.

According to various embodiments, operations 1500 to 1560 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIG. 15, in step 1500, the electronic device 900 may determine (or confirm) whether it is connected to an access point (AP). Upon being connected to the AP, the electronic device 900 may perform step 1510, and upon not being connected to the AP, the electronic device 900 may terminate the operation.

In step 1510, the electronic device 900 may confirm performance information of the connected AP. For example, the performance information of the AP may include information for one or more frequency bands that are capable of being supported by the AP.

In step 1520, the electronic device 900 may determine whether the AP supports the fourth frequency band and the fifth frequency band. When the AP supports the fourth frequency band and the fifth frequency band, the electronic device 900 may perform step 1540, and when the AP does not support the fourth frequency band and the fifth frequency band, the electronic device 900 may terminate the operation. According to one embodiment, when the AP does not support the fourth frequency band and the fifth frequency band, the electronic device 900 may standby the performance of the second communication. For example, the electronic device 900 may display a user interface that activates the second communication after performing a dimming process on the user interface.

In step 1530, the electronic device 900 may determine (or confirm) whether the second communication of the fifth frequency band is enabled. When the second communication of the fifth frequency band is enabled, the electronic device 900 may perform step 1530, and when the second communication of the fifth frequency band is not enabled, in step 1540, the electronic device 900 may determine (or confirm) whether a control of the AP is enabled.

When the control of the AP is enabled, the electronic device 900 may perform step 1560, and when the control of the AP is not enabled, the electronic device 900 may terminate the operation.

In step 1550, the electronic device 900 may change the fourth frequency band of the second communication antenna element (e.g., the fourth antenna element 931) to the fifth frequency band.

In step 1560, the electronic device 900 may ask the AP for request communication activation of the fifth frequency band and a frequency band change, and in step 1550, the electronic device 900 may change the fourth frequency band of the second communication antenna element (e.g., the fourth antenna element 931) to the fifth frequency band.

Figure 16:
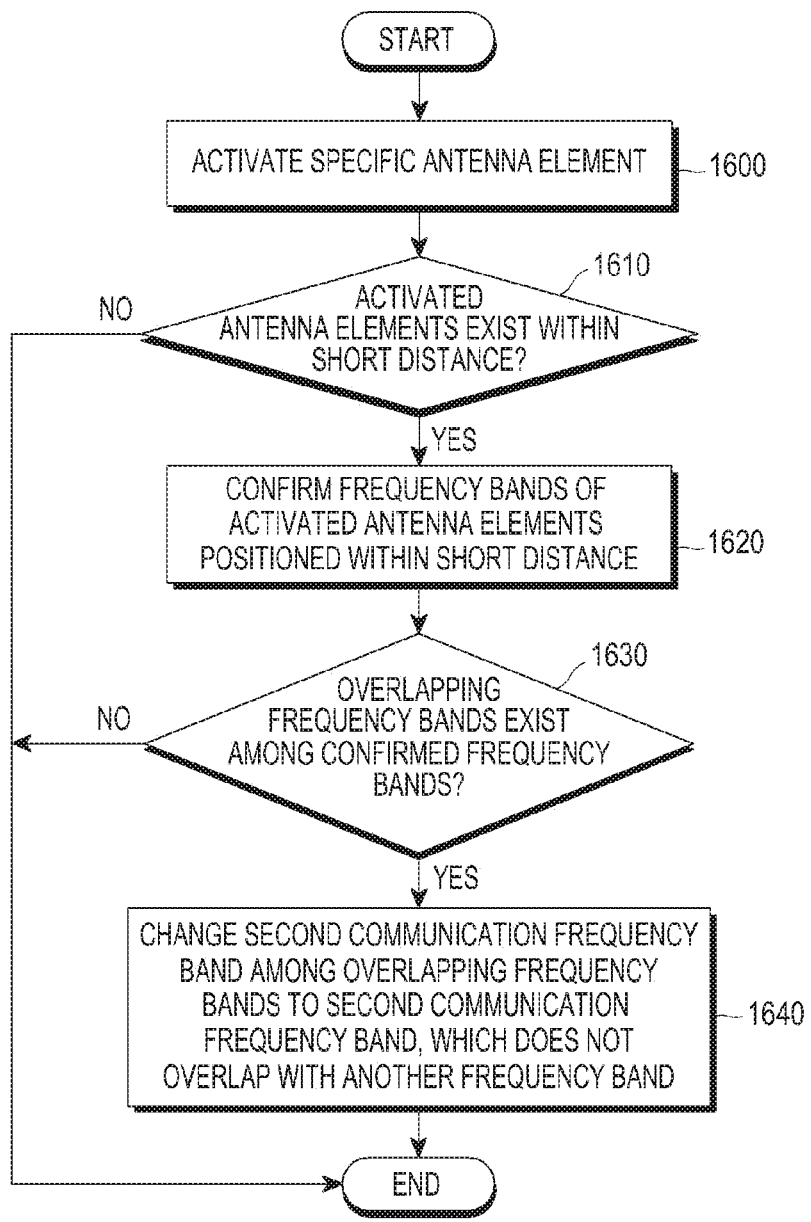
FIG. 16 illustrates operations for managing an SAR by frequency overlapping between neighboring antenna elements in an electronic device according to embodiments of the present disclosure.

FIG. 16 illustrates operations for managing an SAR by frequency overlapping between neighboring antenna elements in an electronic device according to embodiments of the present disclosure.

According to various embodiments, operations 1600 to 1640 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 16, in step 1600, the electronic device 900 may activate a specific antenna element for the first communication or the second communication, and in step 1610, the electronic device 900 may confirm whether the activated antenna elements are positioned within a short distance in relation to each other. When activated antenna elements are positioned within a short distance, the electronic device 900 may perform step 1620, and when activated antenna elements are not positioned within a short distance, the electronic device 900 may terminate the operation.

For example, the electronic device 900 may sense the activation of the fourth antenna element 931 for the second communication during the transmission/reception of a wireless signal through the third antenna element 971 and the second antenna element 961 for the first communication.

The electronic device 900 may determine whether the activated third antenna element 971, second antenna element 961, and fourth antenna element 931 are positioned within a short distance in relation to each other.

In step 1620, the electronic device 900 may confirm the frequency bands for the activated antenna elements, which are positioned within a short distance in relation to each other. For example, when the third antenna element 971 and the fourth antenna element 931 are positioned within a short distance in relation to each other, the electronic device 900 may confirm the frequency bands of the third antenna element 971 and the fourth antenna element 931.

In step 1630, the electronic device 900 determines whether there are overlapping frequency bands among the confirmed frequency bands. When overlapping frequency bands exist, the electronic device 900 may perform step 1640, and when overlapping frequency bands do not exist, the electronic device 900 may terminate the operation. For example, the electronic device 900 may determine whether the first frequency band of the third antenna element 971 and the fourth frequency band of the fourth antenna element 931 overlap with each other.

In step 1640, the electronic device 900 may change the second communication frequency band among the overlapping frequency bands to the second communication frequency band that does not overlap with another frequency band. For example, the first frequency band and the fourth frequency band overlap with or neighbor each other. In such a case, the electronic device 900 may change the fourth frequency band of the fourth antenna element 931 to the fifth frequency band that does not overlap with the first frequency band.

Accordingly, the electronic device 900 transmits a wireless signal of the first frequency band through the third antenna element 971, a wireless signal of the second frequency band through the second antenna element 961, and a wireless signal of the fifth frequency band through the fourth antenna element 931 so that the frequency band overlapping between the third antenna element 971 and the fourth antenna element 931 can be avoided.

Figure 17:
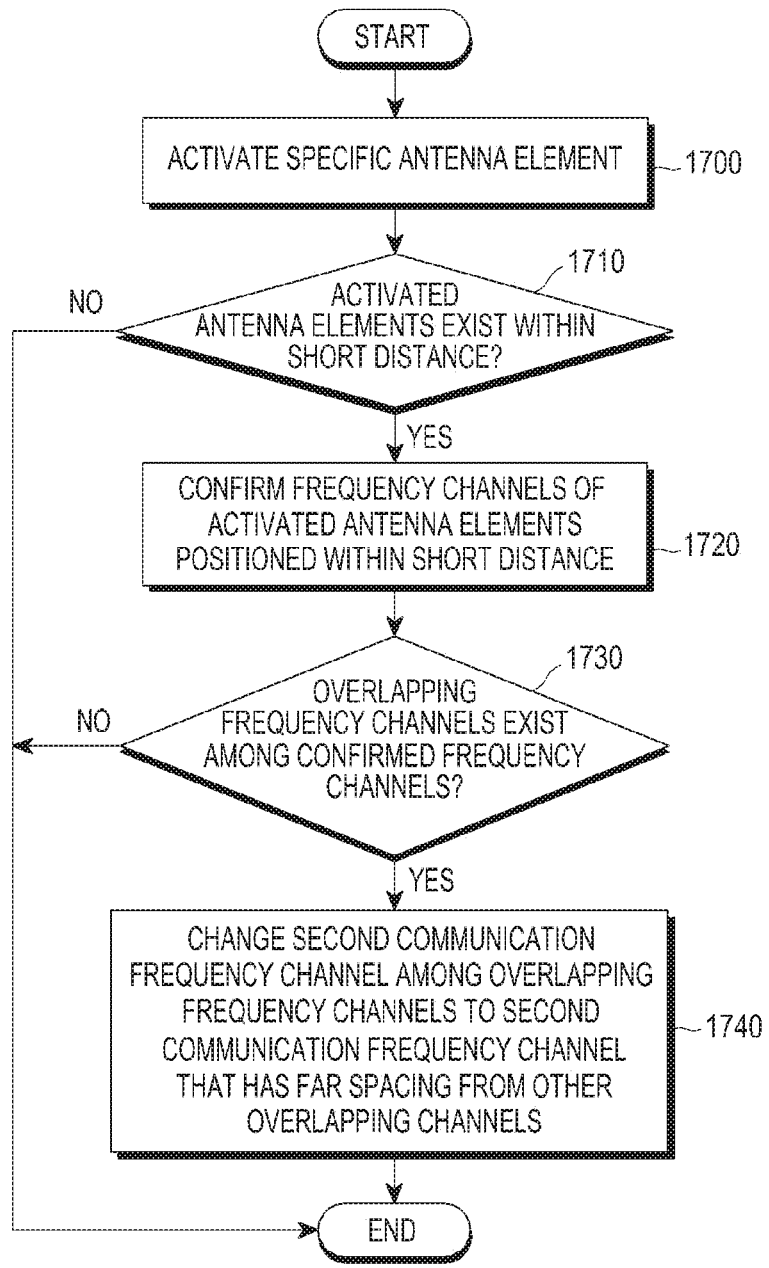
FIG. 17 illustrates operations for managing an SAR by frequency overlapping between neighboring antenna elements in an electronic device according to embodiments of the present disclosure.

FIG. 17 illustrates operations for managing an SAR by frequency overlapping between neighboring antenna elements in an electronic device according to embodiments of the present disclosure.

According to various embodiments, operations 1700 to 1740 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 17, in step 1700, the electronic device 900 may activate a specific antenna element for the first communication or the second communication, and in step 1710, the electronic device 900 may confirm whether the activated antenna elements are positioned within a short distance in relation to each other. When activated antenna elements are positioned within a short distance, the electronic device 900 may perform step 1720, and when activated antenna elements are not positioned within a short distance, the electronic device 900 may terminate the operation. For example, the electronic device 900 may sense the activation of the fourth antenna element 931 for the second communication during the transmission/reception of a wireless signal through the third antenna element 971 and the second antenna element 961 for the first communication.

For example, the processor 910 may determine whether the activated third antenna element 971, second antenna element 961, and fourth antenna element 931 are positioned within a short distance in relation to each other.

In step 1720, the electronic device 900 may confirm the frequency channels of a plurality of activated antenna elements positioned within a short distance. For example, when the third antenna element 971 and the fourth antenna element 931 are positioned within a short distance in relation to each other, the electronic device 900 may confirm the frequency channels of the third antenna element 971 and the fourth antenna element 931.

In step 1730, the electronic device 900 determines whether there are overlapping frequency channels among the confirmed frequency channels. When overlapping frequency channels exist, the electronic device 900 may perform step 1740, and when overlapping frequency channels do not exist, the electronic device 900 may terminate the operation. For example, the electronic device 900 may determine whether the frequency channel of the third antenna element 971 and the frequency channel of the fourth antenna element 931, which are positioned within a short distance in relation to each other, overlap with each other.

In step 1740, the electronic device 900 may change the second communication frequency channel among the overlapping frequency channels to the second communication frequency band that has a far spacing from the other overlapping frequency channels. For example, when it is determined that the frequency channel of the third antenna element 971 and the frequency channel of the fourth antenna element 931, which are positioned within a short distance in relation to each other, overlap with each other, the electronic device 900 may change the frequency channel of the fourth antenna element 931 to a frequency channel that has a large spacing from the frequency channel of the third antenna element 971.

Accordingly, the electronic device 900 transmits a wireless signal of the first frequency channel through the third antenna element 971, and transmits, through the fourth antenna element 931, a wireless signal of the second frequency channel, which has a far (or large) spacing from the first communication frequency channel, so that the frequency band overlapping between the third antenna element 971 and the fourth antenna element 931 can be avoided.

FIGS. 18A, 18B, 18C and 18D are a method for changing frequency channels from overlapping frequency channels to frequency channels that have a far spacing therebetween.

Referring to FIGS. 9 and 18, in a multi-communication situation, when a wireless signal of the first communication frequency channel 1800 is transmitted through the third antenna element 971, and when a wireless signal of the second communication frequency channel 1801 is transmitted through the fourth antenna element 931, the electronic device 900 may suffer from an overlapping of frequency channels as in FIG. 18A. In such a case, the SAR value 1810 of the electronic device 900 may increase by the SAR overlapping as in FIG. 18B.

Accordingly, the electronic device 900 may change the second communication frequency channel of the fourth antenna element 931 to the second communication frequency channel 1802, which has a far (or large spacing) from the first communication frequency channel, as illustrated in FIG. 18C. In such a case, the SAR values 1811 and 1812 of the electronic device 900 may decrease, as illustrated in FIG. 18D.

Figure 19:
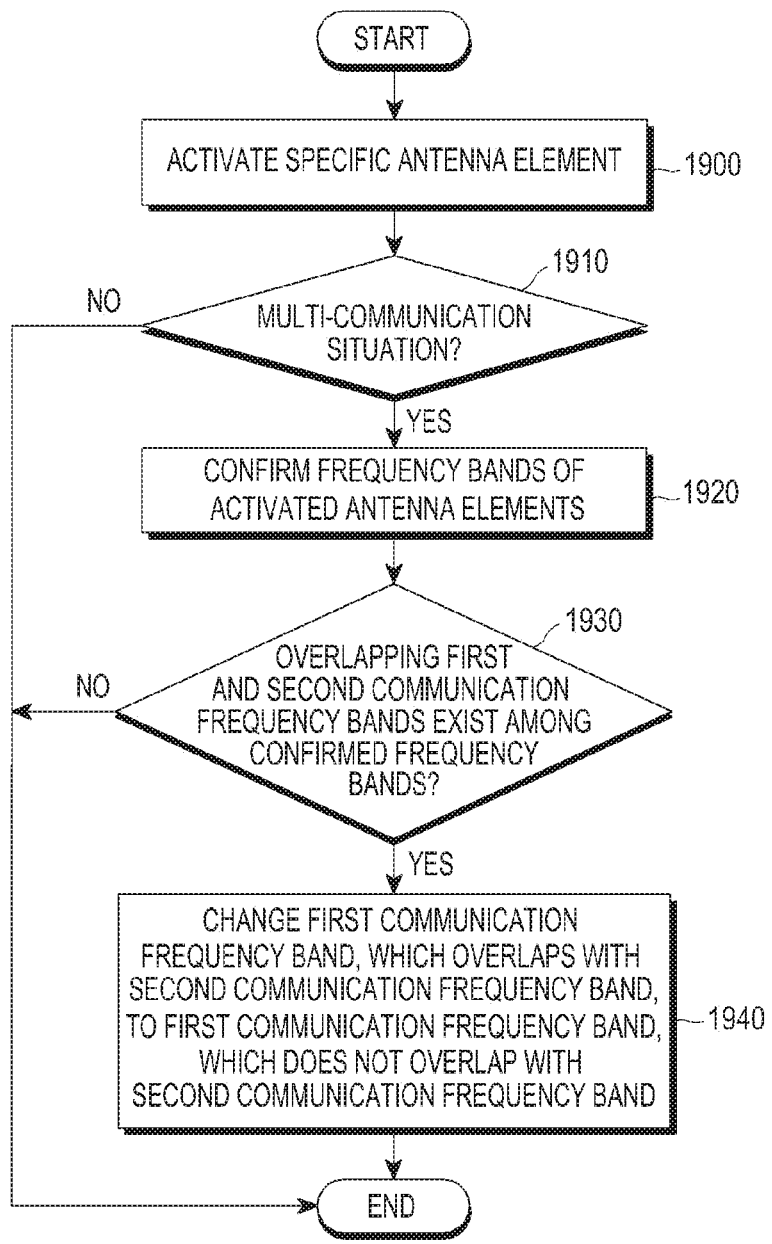
FIG. 19 illustrates operations for managing an SAR by frequency overlapping between antenna elements under a multi-communication situation of an electronic device according to embodiments of the present disclosure.

FIG. 19 illustrates operations for managing an SAR by frequency overlapping between antenna elements under a multi-communication situation of an electronic device according to embodiments of the present disclosure.

According to various embodiments, steps 1900 to 1940 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 19 the electronic device 900 may activate a specific antenna element for the first communication or the second communication.

In step 1910, the processor 910 may confirm whether it is a multi-communication situation in which the first communication and the second communication are performed simultaneously. When it is a multi-communication situation, the electronic device 900 may perform step 1920, and when it is not a multi-communication situation, the electronic device 900 may terminate the operation. For example, the electronic device 900 may sense the activation of the fourth antenna element 931 that is capable of transmitting a wireless signal of the fourth frequency band while a wireless signal of the first frequency band is transmitted through the third antenna element 971 and a wireless signal of the second frequency band is transmitted through the second antenna element 961. In such a case, the electronic device 900 may determine that it is a multi-communication situation.

In step 1920, the electronic device 900 may confirm the frequency bands of a plurality of activated antenna elements. For example, the electronic device 900 may determine each of the frequency bands of the third antenna element 971, second antenna element 961, and fourth antenna element 931.

In step 1930, the electronic device 900 determines whether there are overlapping first and second frequency bands among the confirmed frequency bands. When overlapping first and second frequency bands exist, the electronic device 900 may perform step 1940, and when overlapping frequency bands do not exist, the electronic device 900 may terminate the operation. For example, the electronic device 900 may determine whether the first frequency band of the third antenna element 971, the second frequency band of the second antenna element 961, and the fourth frequency band of the fourth antenna element 931 overlap with each other.

In step 1940, the electronic device 900 may change the first communication frequency band, which overlaps with the second communication frequency band, to the first communication frequency band that does not overlap with the second communication frequency band. For example, the first frequency band and the fourth frequency band overlap with or neighbor each other. In such a case, the electronic device 900 may change the first frequency band of the third antenna element 971 to the third frequency band (e.g., low frequency band, 1 GHz or less) that does not overlap with the fourth frequency band.

Accordingly, the electronic device 900 transmits a wireless signal of the third frequency band through the third antenna element 971, a wireless signal of the second frequency band through the second antenna element 961, and a wireless signal of the fourth frequency band through the fourth antenna element 931 so that the frequency band overlapping between the third antenna element 971 and the fourth antenna element 931 can be avoided.

Figure 20:
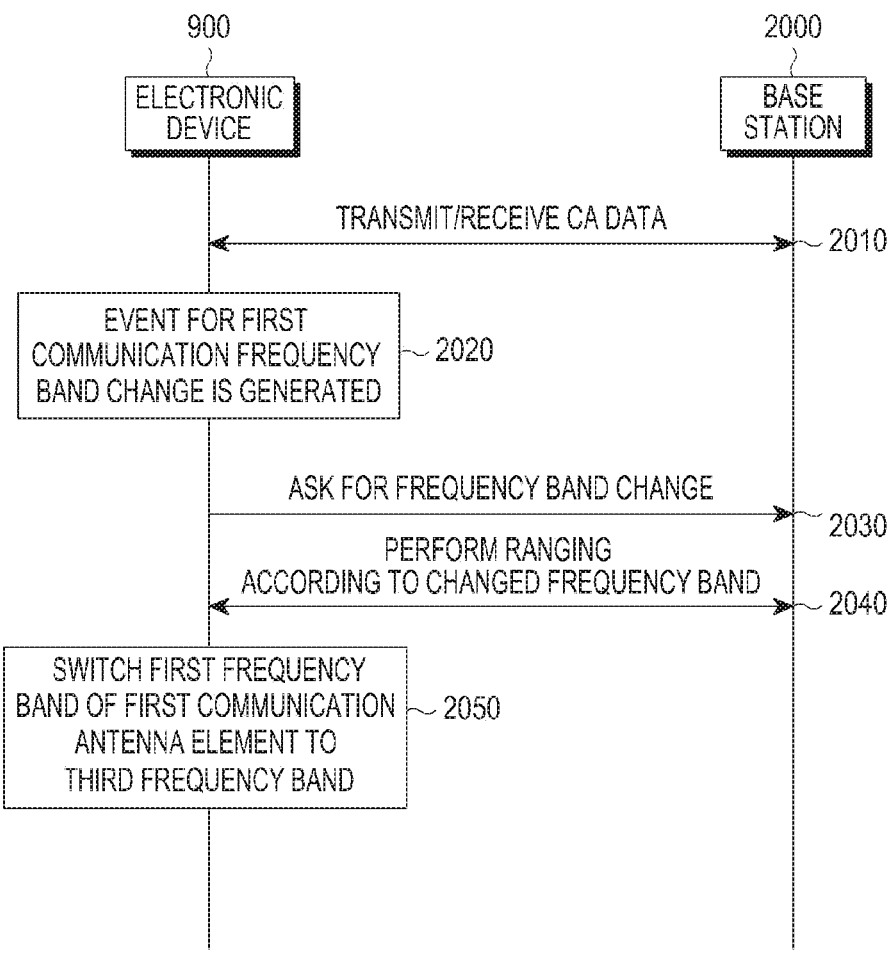
FIG. 20 illustrates operations for changing a first communication frequency band, which overlaps with a second communication frequency band, to a first communication frequency band that does not overlap with a second communication frequency band under a multi-communication situation of an electronic device according to embodiments of the present disclosure.

FIG. 20 illustrates operations for changing a first communication frequency band, which overlaps with a second communication frequency band, to a first communication frequency band that does not overlap with a second communication frequency band under a multi-communication situation of an electronic device according to embodiments of the present disclosure.

According to various embodiments, steps 2010 to 2050 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 20, in step 2010, the electronic device 900 may perform CA data transmission/reception with the base station 2000. For example, the electronic device 900 may perform the first communication with a base station 2000 with two frequency bands by using two or more antenna elements.

In step 2020, when an event for changing the first communication frequency band occurs, the electronic device 900 may transfer a request for a frequency band change to the base station 2000 in step 2030. For example, the electronic device 900 may determine that an event for changing the first communication frequency band when the activation of the fourth antenna element 931 for the second communication is sensed while a wireless signal of the first frequency band is transmitted through the third antenna element 971 and a wireless signal of the second frequency band is transmitted through the second antenna element 961.

The electronic device 900 may transfer, to the base station 2000, a request for changing the first communication frequency band from the first frequency band to the third frequency band (e.g., low frequency band).

In step 2040, the electronic device 900 and the base station 2000 may perform ranging according to the changed frequency band. For example, the electronic device 900 may perform time synchronization and uplink synchronization with the base station 2000, or a communication control according to the third frequency band.

In step 2050, the electronic device 900 may switch the first frequency band of the first communication antenna element to the third frequency band. For example, the electronic device 900 may change the first frequency band of the third antenna element 971 to the third frequency band that does not overlap with the frequency band of the fourth antenna element 931.

Accordingly, the electronic device 900 may reduce or suppress an increase in the SAR value according to frequency overlapping.

Figure 21:
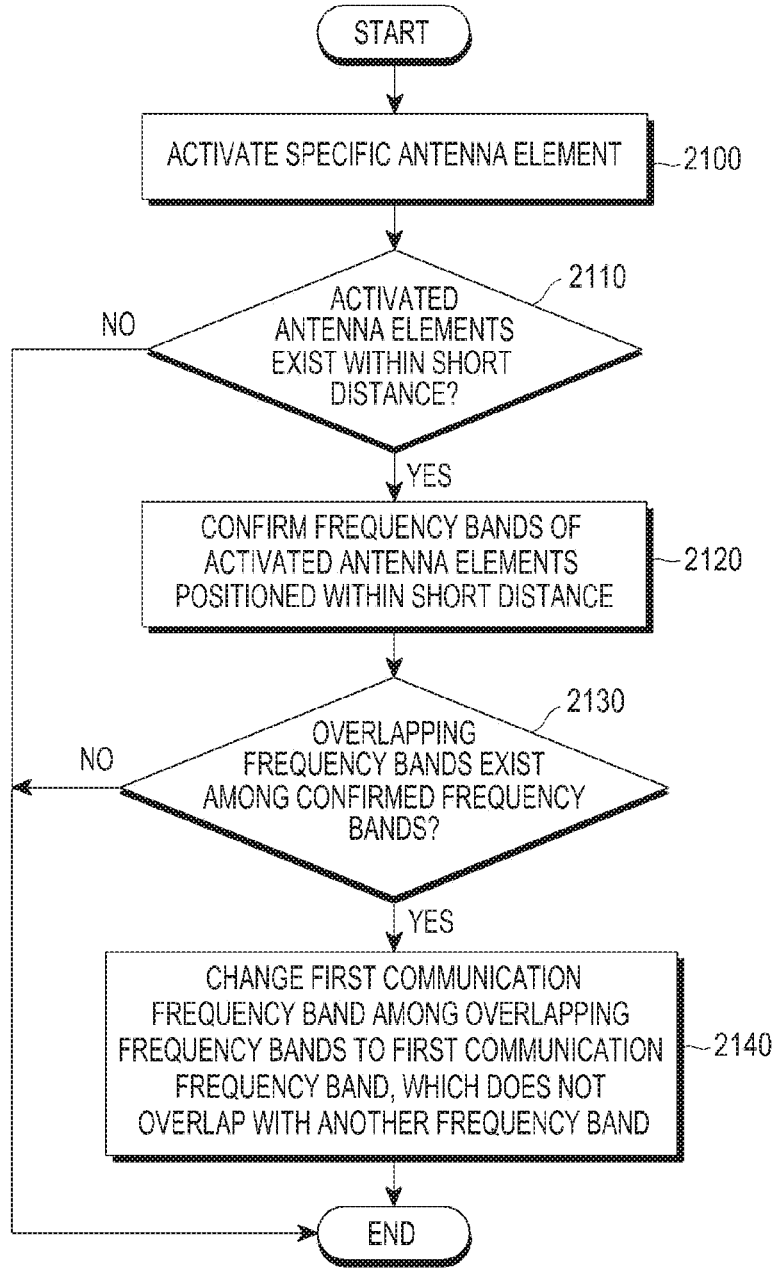
FIG. 21 illustrates operations for managing an SAR by frequency overlapping between neighboring antenna elements in an electronic device according to embodiments of the present disclosure.

FIG. 21 illustrates operations for managing an SAR by frequency overlapping between neighboring antenna elements in an electronic device according to embodiments of the present disclosure.

According to various embodiments, steps 2100 to 2140 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 21, in step 2100, the electronic device 900 may activate a specific antenna element for the first communication or the second communication.

In step 2110, the electronic device 900 may confirm whether activated antenna elements are positioned within a short distance in relation to each other. When activated antenna elements are positioned within a short distance, the electronic device 900 may perform step 2120, and when activated antenna elements are not positioned within a short distance, the electronic device 900 may terminate the operation. For example, the electronic device 900 may sense the activation of the fourth antenna element 931 for the second communication during the transmission/reception of a wireless signal through the third antenna element 971 and the second antenna element 961 for the first communication.

For example, the electronic device 900 may determine whether the activated third antenna element 971, second antenna element 961, and fourth antenna element 931 are positioned within a short distance in relation to each other.

In step 2120, the electronic device 900 may confirm the frequency bands of the activated antenna elements, which are positioned within a short distance in relation to each other. For example, when the third antenna element 971 and the fourth antenna element 931 are positioned within a short distance in relation to each other, the electronic device 900 may confirm the frequency bands of the third antenna element 971 and the fourth antenna element 931.

In step 2130, the electronic device 900 determines whether there are overlapping frequency bands among the confirmed frequency bands. When overlapping frequency bands exist, the electronic device 900 may perform step 2140, and when overlapping frequency bands do not exist, the electronic device 900 terminate the operation. For example, the electronic device 900 may determine whether the first frequency band of the third antenna element 971, the second frequency band of the second antenna element 961, and the fourth frequency band of the fourth antenna element 931 overlap with each other.

In step 2140, the electronic device 900 may change the first communication frequency band among the overlapping frequency bands to the first communication frequency band that does not overlap with other frequency bands. For example, the first frequency band and the fourth frequency band overlap with or neighbor each other. In such a case, the electronic device 900 may change the first frequency band of the third antenna element 971 to the third frequency band or the second frequency band that does not overlap with the fourth frequency band. According to embodiments, the electronic device 900 may change the frequency band of the first antenna element 971 from the LTE frequency band to the 3G frequency band. For example, the electronic device 900 may change a protocol, which is used in the third antenna element 971, from an LTE protocol to a 3G protocol.

Accordingly, the electronic device 900 transmits, through the third antenna element 971, a wireless signal of the third frequency band or the second frequency band that does not overlap with the fourth frequency band, and transmits a wireless signal of the fourth frequency band through the fourth antenna element 931 so that the frequency band overlapping between the second antenna element 971 and the fourth antenna element 931 can be avoided.

Figure 22:
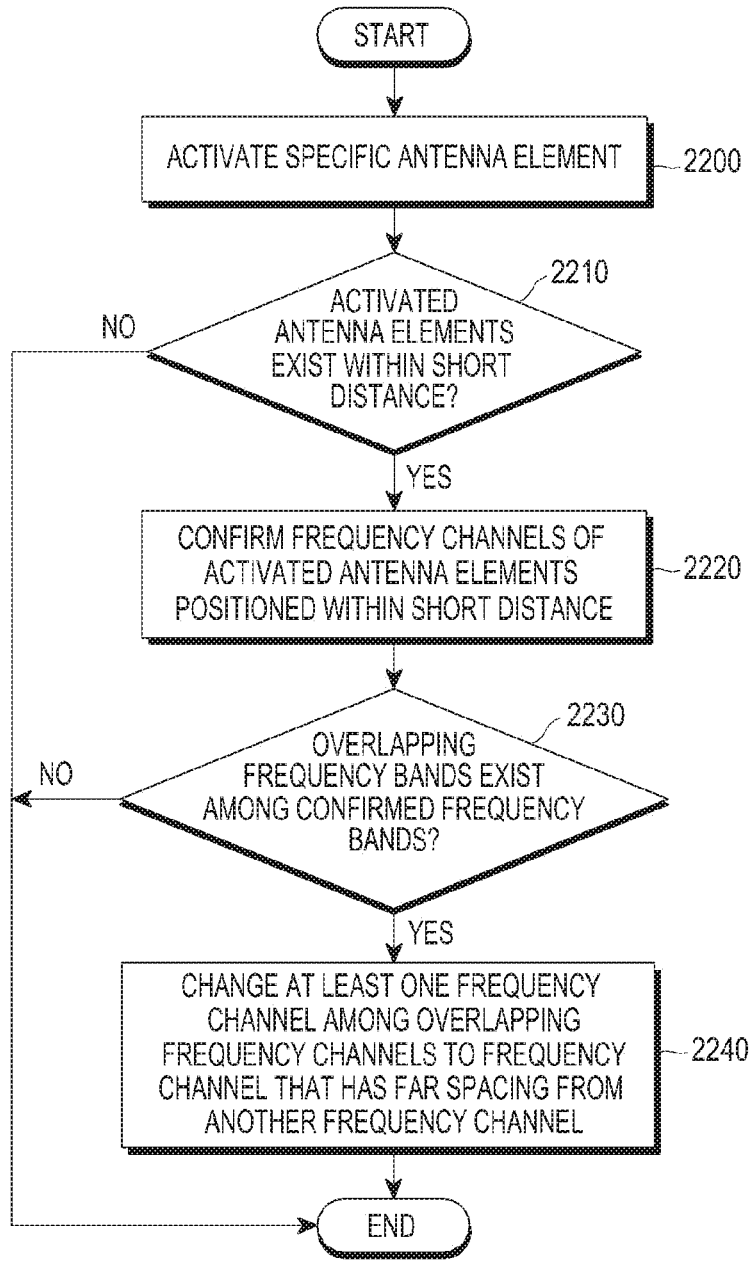
FIG. 22 illustrates operations for managing an SAR by frequency overlapping between neighboring antenna elements in an electronic device according to embodiments of the present disclosure.

FIG. 22 illustrates operations for managing an SAR by frequency overlapping between neighboring antenna elements in an electronic device according to embodiments of the present disclosure.

According to various embodiments, steps 2100 to 2140 may be executed through an electronic device 101, 104, 201, 400, 500, 600, 700, or 900, a wearable electronic device 800, a server 106, a processor 120, 210, or 910, a communication module 220 (e.g., a cellular module 221, a WiFi module 223, a Bluetooth module 225, an RF module 229), a program module 310, a first wireless communication circuit 420 or 920, or a second communication module 430 or 930.

Referring to FIGS. 9 and 22, in step 2200, the electronic device 900 may activate a specific antenna element for the first communication or the second communication.

In step 2210, the electronic device 900 may confirm whether activated antenna elements are positioned within a short distance in relation to each other. When activated antenna elements are positioned within a short distance, the electronic device 900 may perform step 2220, and when activated antenna elements are not positioned within a short distance, the electronic device 900 may terminate the operation. For example, the electronic device 900 may sense the activation of the fourth antenna element 931 for the second communication during the transmission/reception of a wireless signal through the third antenna element 971 and the second antenna element 961 for the first communication.

For example, the electronic device 900 may determine whether the activated third antenna element 971, second antenna element 961, and fourth antenna element 931 are positioned within a short distance in relation to each other.

In step 2220, the electronic device 900 may confirm the frequency channels of a plurality of activated antenna elements. For example, when the third antenna element 971 and the fourth antenna element 931 are positioned within a short distance in relation to each other, the electronic device 900 may confirm the frequency channels of the third antenna element 971 and the fourth antenna element 931.

In step 2230, the electronic device 900 determines whether there are overlapping frequency channels among the confirmed frequency channels. When overlapping frequency channels exist, the electronic device 900 may perform step 2240, and when overlapping frequency channels do not exist, the electronic device 900 may terminate the operation. For example, the electronic device 900 may determine whether the frequency channel of the third antenna element 971 and the frequency channel of the fourth antenna element 931, which are positioned within a short distance in relation to each other, overlap with each other.

In step 2240, the electronic device 900 may change at least one communication frequency channel among the overlapping frequency channels to a frequency channel that has a far spacing from another frequency channel. For example, when it is determined that the frequency channel of the third antenna element 971 and the frequency channel of the fourth antenna element 931 overlap with each other, the electronic device 900 may change the frequency channel of the third antenna element 971 to a frequency channel (e.g., 2 GH or less or 3 GHz or more) that has a large spacing from the frequency channel of the fourth antenna element 931. According to embodiments, the electronic device 900 may change the LTE frequency channel of the third antenna element 971 to a 3G frequency channel that has a large spacing from the WiFi frequency channel of the fourth antenna element 931.

Accordingly, the electronic device 900 transmits, through the third antenna element 971, a wireless signal of a frequency channel that has a far (or large) spacing from the frequency channel of the fourth antenna element 931 so that the frequency overlapping between the third antenna element 971 and the fourth antenna element 931 can be avoided.

In embodiments, even if an antenna for second communication is activated while the electronic device transmits/receives wireless signals of a plurality of frequency bands for first communication, an increase in an SAR value by frequency overlapping can be reduced or suppressed so that uplink high speed communication can be provided.

The term "module" as used herein may include a unit consisting of hardware, software, or firmware, and may be used interchangeably with the term "logic", "logical block", "component", "circuit". The "module" may be an integrated component, or a minimum unit for performing one or more functions or a part thereof. The "module" may be mechanically or electronically implemented, and may include an application-specific integrated circuit (ASIC) chip, field-programmable gate arrays (FPGAs), or a programmable logic device for performing certain operations, which has been known or will be developed in the future. At least some of devices (e.g., modules or functions thereof) or methods according to embodiments may be implemented by an instruction which is stored a computer-readable storage medium in the form of a program module. The instruction, when executed by a processor, may cause the one or more processors to execute the function corresponding to the instruction. The computer-readable storage medium may include a hard disk, a floppy disk, a magnetic medium (e.g., a magnetic tape), an optical media (e.g., CD-ROM, DVD), a magneto-optical media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to embodiments may be executed sequentially, in parallel, repeatedly, or in a heuristic manner. At least some operations may be executed according to another sequence, may be omitted, or may further include other operations.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing that includes a first face that faces in a first direction, a second face that faces in a second direction that is opposite to, or different from, the first direction, and a third face that encloses at least a portion of a space between the first face and the second face;
   a first antenna element that is adjacent to, or is positioned in, a first portion of the housing;
   a second antenna element that is adjacent to, or is positioned in, a second portion of the housing;
   a third antenna element that is adjacent to, or is positioned in, a third portion of the housing, a first distance between the first portion and the third portion being shorter than a distance between the second portion and the third portion;
   a first wireless communication circuit that is configured to transmit, through one of the first antenna element and the second antenna element, a first wireless signal of a first frequency band, and transmit, through another one of the first antenna element and the second antenna element, a second wireless signal of a second frequency band which is lower than the first frequency band, the first wireless signal and the second wireless signal being used together and providing carrier aggregation (CA);
   a second wireless communication circuit that is configured to transmit, through the third antenna element, a third wireless signal of a third frequency band, which at least partially overlap with the first frequency band;
   a processor that is electrically connected to the first wireless communication circuit and the second wireless communication circuit; and
   a storage device that is electrically connected to the processor,
   wherein the storage device stores instructions that, when being executed, cause the processor to control the first wireless communication circuit such that:
   when the first wireless communication circuit and the second wireless communication circuit are at least partially simultaneously used, the first wireless signal is provided through the second antenna element, and the second wireless signal is provided through the first antenna element; and
   when the first wireless communication circuit and the second wireless communication circuit are not simultaneously used, the first wireless signal is provided through any one of the first antenna element and the second antenna element, and the second wireless signal is provided through another one of the first antenna element and the second antenna element.

2. The electronic device of claim 1, wherein the first portion and the second portion of the housing are formed by portions of the third face.

3. The electronic device of claim 2, wherein the third antenna element is set to be positioned to be adjacent to the third portion of the housing within the space.

4. The electronic device of claim 1, wherein the first face has a quadrilateral cross section when viewed from above the first face, and
   the quadrilateral cross section includes:
   a first peripheral portion that has a first length;
   a second peripheral portion that has a second length which is longer than the first length, and vertically extends from the first peripheral portion;
   a third peripheral portion that has the first length, and vertically extends from the second peripheral portion; and
   a fourth peripheral portion that has the second length, and vertically extends from the third peripheral portion, and
   the first portion of the housing is formed in at least a portion of the first peripheral portion, and the second portion of the housing is formed in at least a portion of the third peripheral portion.

5. The electronic device of claim 4, wherein the third portion of the housing is formed in at least a portion of the first peripheral portion.

6. The electronic device of claim 1, wherein the first wireless communication circuit is configured to support a long term evolution (LTE) protocol of a version that supports the CA.

7. The electronic device of claim 6, wherein the second wireless communication circuit is configured to support a wireless fidelity (WiFi) protocol that supports 2.4 gigahertz (GHz) frequency communication.

8. The electronic device of claim 1, wherein the first frequency band is in a range of 2.3 gigahertz (GHz) to 2.7 GHz, the second frequency band is in a range of 1.7 GHz to 2.1 GHz, and the third frequency band is 2.4 GHz or 5 GHz.

9. The electronic device of claim 1, further comprising:
   a fourth antenna element that is adjacent to, or is positioned in, a fourth portion of the housing,
   wherein the first wireless communication circuit transmits a fourth wireless signal of a fourth frequency band through another one of the first antenna element, the second antenna element, and the fourth antenna element, and
   the processor is configured to control the first wireless communication circuit such that:

when the first wireless communication circuit and the second wireless communication circuit are at least partially simultaneously used, the first wireless signal is provided through the fourth antenna element, and the fourth wireless signal is provided through the first antenna element, and when the first wireless communication circuit and the second wireless communication circuit are not simultaneously used, the first wireless signal is provided through any one of the first antenna element, the second antenna element, and the third antenna element, the second wireless signal is provided through another one of the first antenna element, the second antenna element, and the third antenna element, and the fourth wireless signal is provided through still another one of the first antenna element, the second antenna element, and the third antenna element.

10. The electronic device of claim 9, wherein the second frequency band and the fourth frequency band are lower than the first frequency band, and the first wireless signal, the second wireless signal, and the fourth wireless signal are set to be used together so as to provide the CA.

11. The electronic device of claim 10, wherein the first portion, the second portion, or the third portion of the housing are formed in portions of the third face.

12. The electronic device of claim 11, wherein the third antenna element is set to be positioned to be adjacent to the fourth portion of the housing within the space.

13. The electronic device of claim 10, wherein the third portion of the housing is formed in at least a portion of the third peripheral portion.

14. The electronic device of claim 13, wherein the forth portion of the housing is formed in at least a portion of the first peripheral portion.

15. The electronic device of claim 10, wherein the fourth frequency band is 2.4 GHz or 5 GHz.

16. A method for managing a specific absorption rate (SAR) in an electronic device that includes a housing that includes a first face that faces in a first direction, a second face that faces in a second direction that is opposite to, or different from, the first direction, and a third face that encloses at least a portion of a space between the first face and the second face, a first antenna element that is adjacent to, or is positioned in, a first portion of the housing, a second antenna element that is adjacent to, or is positioned in, a second portion of the housing, a third antenna element that is adjacent to, or is positioned in, a third portion of the housing, a first distance between the first portion and the third portion being shorter than a distance between the second portion and the third portion, a first wireless communication circuit that is configured to transmit, through one of the first antenna element and the second antenna element, a first wireless signal of a first frequency band, and to transmit, through another one of the first antenna element and the second antenna element, a second wireless signal of a second frequency band, and a second wireless communication circuit that is configured to transmit, through the third antenna element, a third wireless signal of a third frequency band, wherein the method comprises:

determining whether the first wireless communication circuit and the second wireless communication circuit are used together in order to provide Carrier Aggregation (CA);

determining, when the first wireless communication circuit and the second wireless communication circuit are used together, whether the third frequency band at least partially overlaps with the frequency band;

providing, when the third frequency band at least partially overlaps with the first frequency band, the first wireless signal through the second antenna element, and the second wireless signal through the first antenna element; and providing, when the first wireless communication circuit and the second wireless communication circuit are not simultaneously used, the first wireless signal through any one of the first antenna element and the second antenna element, and the second wireless signal is provided through another one of the first antenna element and the second antenna element.

17. The method of claim 16, wherein the second frequency band is lower than the first frequency band, and the third frequency band at least partially overlaps with the first frequency band.

18. The method of claim 17, wherein the second wireless communication circuit is configured to support a wireless fidelity (WiFi) protocol that supports 2.4 gigahertz (GHz) frequency communication.

19. The method of claim 16, wherein the first wireless communication circuit is configured to support a long term evolution (LTE) protocol of a version that supports the CA.

20. The method of claim 16, wherein the first frequency band is in a range of 2.3 GHz to 2.7 GHz, the second frequency band is in a range of 1.7 GHz to 2.1 GHz, and the third frequency band is 2.4 GHz or 5 GHz.

21. The method of claim 16, wherein the electronic device further includes a fourth antenna element that is adjacent to, or is positioned in, a fourth portion of the housing, and the method further comprises: transmitting a fourth wireless signal of a fourth frequency band through still another one of the first antenna element, the second antenna element, and the fourth antenna element, and when the first wireless communication circuit and the second wireless communication circuit are used together, providing the first wireless signal, through the fourth antenna element and the fourth wireless signal through the first antenna element.

22. The method of claim 21, wherein the second frequency band and the fourth frequency band are lower than the first frequency band, and the first wireless signal, the second wireless signal, and the fourth wireless signal are used together so as to provide the CA.

* * * * *